United States Patent
Hernandez-Torres et al.

(10) Patent No.: US 10,047,210 B2
(45) Date of Patent: Aug. 14, 2018

(54) BIO-BASED BINDERS INCLUDING CARBOHYDRATES AND A PRE-REACTED PRODUCT OF AN ALCOHOL OR POLYOL AND A MONOMERIC OR POLYMERIC POLYCARBOXYLIC ACID

(71) Applicant: Owens Corning Intellectual Capital, LLC, Toledo, OH (US)

(72) Inventors: Jesus Hernandez-Torres, Pataskala, OH (US); Larry Todd Banner, Ottumwa, IA (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/565,545

(22) Filed: Dec. 10, 2014

(65) Prior Publication Data

US 2015/0152244 A1    Jun. 4, 2015

Related U.S. Application Data

(62) Division of application No. 14/110,079, filed as application No. PCT/US2012/032118 on Apr. 4, 2012, now abandoned.

(60) Provisional application No. 61/473,043, filed on Apr. 7, 2011.

(51) Int. Cl.

| | |
|---|---|
| C08K 5/11 | (2006.01) |
| D06M 15/11 | (2006.01) |
| D04H 1/587 | (2012.01) |
| C09J 103/02 | (2006.01) |
| C09J 103/04 | (2006.01) |
| C09J 105/06 | (2006.01) |
| D06M 15/327 | (2006.01) |
| E04B 1/78 | (2006.01) |
| C08K 9/04 | (2006.01) |

(52) U.S. Cl.
CPC ............... *C08K 5/11* (2013.01); *C08K 9/04* (2013.01); *C09J 103/02* (2013.01); *C09J 103/04* (2013.01); *C09J 105/06* (2013.01); *D04H 1/587* (2013.01); *D06M 15/11* (2013.01); *D06M 15/327* (2013.01); *E04B 1/78* (2013.01); *Y10T 442/2992* (2015.04)

(58) Field of Classification Search
CPC ....... C08L 67/02; C08K 5/0025; C08K 5/092; C08K 5/11; C08K 9/04; C09J 103/02; C09J 103/04; C09J 105/06; D04H 1/587; D06M 15/11; D06M 15/327; E04B 1/78; Y10T 442/2992

See application file for complete search history.

(56) References Cited

U.S. PATENT DOCUMENTS

| | | |
|---|---|---|
| 2,407,548 A | 9/1946 | Goldman |
| 3,416,288 A | 12/1968 | Coons |
| 3,669,638 A | 6/1972 | Wong et al. |
| 3,705,073 A | 12/1972 | Merzocchi et al. |
| 3,759,854 A | 9/1973 | Chang et al. |
| 3,846,977 A | 11/1974 | Hollander |
| 3,944,690 A | 3/1976 | Distler et al. |
| 4,052,257 A | 10/1977 | Hill et al. |
| 4,054,713 A | 10/1977 | Sakaguchi et al. |
| 4,324,833 A | 4/1982 | Yau |
| 5,055,428 A | 10/1991 | Porter |
| 5,077,361 A | 12/1991 | Hughes et al. |
| 5,116,980 A | 5/1992 | Floyd et al. |
| 5,134,160 A | 7/1992 | Whitekettle et al. |
| 5,162,394 A | 11/1992 | Trocino |
| 5,208,075 A | 5/1993 | Kroner et al. |
| 5,284,700 A | 2/1994 | Strauss et al. |
| 5,318,990 A | 6/1994 | Strauss |
| 5,321,064 A | 6/1994 | Vaidya et al. |
| 5,340,868 A | 8/1994 | Straus et al. |
| 5,346,947 A | 9/1994 | Guerro et al. |
| 5,371,140 A | 12/1994 | Parks |
| 5,393,335 A | 2/1995 | Puckett et al. |
| 5,430,070 A | 7/1995 | Kono |
| 5,446,078 A | 8/1995 | Vaidya et al. |
| 5,480,963 A | 1/1996 | Jiang et al. |
| 5,523,264 A | 6/1996 | Mattison |
| 5,565,254 A | 10/1996 | Norvell |
| 5,582,682 A | 12/1996 | Feretti |

(Continued)

FOREIGN PATENT DOCUMENTS

| | | |
|---|---|---|
| CN | 101203555 | 6/2008 |
| CN | 101218186 | 7/2008 |

(Continued)

OTHER PUBLICATIONS de Meireless Brioude et al., "Synthesis and Characterization of Aliphatic Polyesters from Glycerol, by-Product of Biodiesel Production, and Adipic Acid", Materials Research, vol. 10, No. 4, 335-339 2007.

(Continued)

*Primary Examiner* — Ling Choi
*Assistant Examiner* — Gennadiy Mesh
(74) *Attorney, Agent, or Firm* — Calfee, Halter & Griswold LLP

(57) ABSTRACT

An environmentally friendly, formaldehyde-free, aqueous binder composition that includes a carbohydrate, a cross-linking agent, and a pre-reacted product of an alcohol or polyol and monomeric or polymeric polycarboxylic acid or polyglycerol is provided. The pre-reacted product may include glycerol and esters of citric acid such a monoglyceryl citrate, diglyceryl citrate, and triglyceryl citrate as well as other higher molecular weight citric acid-based esters. The inclusion of the pre-reacted product in the binder composition helps to speed the crosslinking reaction, induces faster water evaporation, decreases the viscosity of the binder, helps to reduce the amount of water needed for application of the binder, decreases tackiness, and helps to achieve a maximum vertical expansion of the insulation pack in the transfer zone. The binder composition may be used in the formation of insulation materials and non-woven chopped strand mats.

9 Claims, 5 Drawing Sheets

(56) References Cited

U.S. PATENT DOCUMENTS

| | | |
|---|---|---|
| 5,635,123 A | 6/1997 | Riebel et al. |
| 5,661,213 A | 8/1997 | Arkens et al. |
| 5,714,264 A | 2/1998 | Sacharski et al. |
| 5,888,292 A | 3/1999 | Tremblay |
| 5,895,804 A | 4/1999 | Lee et al. |
| 5,932,499 A | 8/1999 | Xu et al. |
| 5,983,598 A | 11/1999 | Quinones |
| 6,182,422 B1 | 2/2001 | Andersen et al. |
| 6,221,973 B1 | 4/2001 | Arkens et al. |
| 6,274,661 B1 | 8/2001 | Chen et al. |
| 6,299,936 B1 | 10/2001 | Reck et al. |
| 6,331,350 B1 | 12/2001 | Taylor et al. |
| 6,369,104 B1 | 4/2002 | Kleina et al. |
| 6,399,694 B1 | 6/2002 | McGrath et al. |
| 6,439,383 B1 | 8/2002 | Janousek |
| 6,447,596 B1 | 9/2002 | Tremblay et al. |
| 6,527,014 B1 | 3/2003 | Aubourg |
| 6,613,152 B1 | 9/2003 | Maas et al. |
| 6,632,925 B1 | 10/2003 | Zhang et al. |
| 6,699,945 B1 | 3/2004 | Chen et al. |
| 6,878,455 B2 | 4/2005 | Kunzel et al. |
| 6,884,849 B2 | 4/2005 | Chen et al. |
| 6,890,666 B2 | 5/2005 | Kunzel et al. |
| 6,933,349 B2 | 8/2005 | Chen et al. |
| 7,026,390 B2 | 4/2006 | O'Brien Bernini et al. |
| 7,141,626 B2 | 11/2006 | Rodrigues et al. |
| 7,258,802 B2 | 8/2007 | Miks |
| 7,754,020 B2 | 7/2010 | Cline et al. |
| 7,772,347 B2 | 8/2010 | Swift et al. |
| 7,780,858 B2 | 8/2010 | Miks |
| 7,803,879 B2 | 9/2010 | Srinivasan et al. |
| 7,807,771 B2 | 10/2010 | Swift et al. |
| 7,829,197 B2 | 11/2010 | Chen et al. |
| 7,829,611 B2 | 11/2010 | Kelly |
| 7,842,382 B2 | 11/2010 | Heibing |
| 7,854,980 B2 | 12/2010 | Jackson et al. |
| 7,893,154 B2 | 2/2011 | Van Herwijnen |
| 7,935,274 B2 | 3/2011 | Schlosser |
| 8,035,049 B2 | 10/2011 | Ruid et al. |
| 8,197,587 B2 | 6/2012 | Jaffrennou et al. |
| 8,569,315 B2 | 10/2013 | Sianawati |
| 8,864,893 B2 | 10/2014 | Hawkins et al. |
| 8,980,807 B2 | 3/2015 | Hora et al. |
| 2001/0033926 A1 | 10/2001 | Matthews et al. |
| 2002/0182965 A1 | 12/2002 | Snyder |
| 2002/0188055 A1 | 12/2002 | Chen et al. |
| 2003/0008978 A1 | 1/2003 | Chen et al. |
| 2003/0022580 A1 | 1/2003 | Bogrett et al. |
| 2003/0181602 A1 | 9/2003 | Ansmann et al. |
| 2004/0001963 A1 | 1/2004 | Watanabe et al. |
| 2004/0043686 A1 | 3/2004 | Batdort |
| 2004/0103604 A1 | 6/2004 | Kunzel et al. |
| 2004/0122166 A1 | 6/2004 | O'Brien et al. |
| 2004/0254285 A1 | 12/2004 | Rodrigues et al. |
| 2005/0070186 A1 | 3/2005 | Shoemake et al. |
| 2005/0084675 A1 | 4/2005 | Wang |
| 2005/0170721 A1 | 8/2005 | Toas et al. |
| 2005/0192390 A1 | 9/2005 | Dobrowolski et al. |
| 2005/0215153 A1 | 9/2005 | Cossement et al. |
| 2005/0260368 A1 | 11/2005 | Ruid et al. |
| 2005/0284065 A1 | 12/2005 | Shaffer |
| 2006/0057365 A1 | 3/2006 | Swoboda |
| 2006/0111480 A1 | 5/2006 | Hansen et al. |
| 2006/0178064 A1 | 8/2006 | Balthes et al. |
| 2006/0252855 A1 | 11/2006 | Pisanova et al. |
| 2006/0252955 A1 | 11/2006 | Pisanova et al. |
| 2007/0010651 A1 | 1/2007 | Finch et al. |
| 2007/0014995 A1 | 1/2007 | Chacko et al. |
| 2007/0027283 A1 | 2/2007 | Swift et al. |
| 2007/0036975 A1 | 2/2007 | Milele et al. |
| 2007/0054082 A1 | 3/2007 | Beyer et al. |
| 2007/0187019 A1 | 12/2007 | Chen et al. |
| 2008/0051539 A1 | 2/2008 | Kelly |
| 2008/0108741 A1 | 5/2008 | VanHerwijnen et al. |
| 2008/0115460 A1 | 5/2008 | Ruid et al. |
| 2008/0156041 A1 | 7/2008 | Cooper |
| 2008/0216450 A1 | 9/2008 | MacLeod et al. |
| 2008/0281285 A1 | 11/2008 | Noda et al. |
| 2009/0020448 A1 | 1/2009 | Emond |
| 2009/0068416 A1 | 3/2009 | Noda et al. |
| 2009/0080938 A1 | 3/2009 | Nanamine |
| 2009/0098387 A1 | 4/2009 | Brady et al. |
| 2009/0156080 A1 | 6/2009 | Finch et al. |
| 2009/0169867 A1 | 7/2009 | Kelly |
| 2009/0170978 A1 | 7/2009 | Kelly |
| 2009/0250183 A1 | 10/2009 | Hayes et al. |
| 2009/0275699 A1 | 11/2009 | Zhang et al. |
| 2009/0324915 A1 | 12/2009 | Swift et al. |
| 2010/0003522 A1 | 1/2010 | Chen et al. |
| 2010/0048813 A1 | 2/2010 | Clauss et al. |
| 2010/0029266 A1 | 3/2010 | Saint-Gobain |
| 2010/0063166 A1 | 3/2010 | Behler |
| 2010/0139899 A1 | 6/2010 | Suzuki et al. |
| 2010/0147032 A1 | 6/2010 | Chacko et al. |
| 2010/0203790 A1 | 8/2010 | Moulton et al. |
| 2010/0222463 A1 | 9/2010 | Brady et al. |
| 2010/0242402 A1 | 9/2010 | Briner |
| 2010/0282996 A1 | 11/2010 | Jaffrennou et al. |
| 2010/0300983 A1 | 12/2010 | Miks |
| 2010/0301256 A1 | 12/2010 | Hampson et al. |
| 2010/0305271 A1 | 12/2010 | Mentlink et al. |
| 2010/0310867 A1 | 12/2010 | VanHerwijnen et al. |
| 2010/0320113 A1 | 12/2010 | Swift |
| 2011/0021101 A1 | 1/2011 | Hawkins |
| 2011/0060095 A1 | 3/2011 | Tutin et al. |
| 2011/0086567 A1 | 4/2011 | Hawkins et al. |
| 2011/0091710 A1 | 4/2011 | Mirth et al. |
| 2011/0100256 A1 | 5/2011 | Anderson et al. |
| 2011/0200814 A1 | 8/2011 | Hernandez-Torres |
| 2011/0210280 A1 | 9/2011 | Jaffrennou et al. |
| 2011/0223364 A1 | 9/2011 | Hawkins et al. |
| 2011/0263757 A1 | 10/2011 | Rand |
| 2012/0065417 A1 | 3/2012 | Hora et al. |
| 2012/0070645 A1 | 3/2012 | Jaffrennou et al. |
| 2012/0122758 A1 | 5/2012 | Andjelic et al. |
| 2012/0133073 A1 | 5/2012 | Pecorel et al. |
| 2012/0144868 A1 | 6/2012 | Mirth et al. |
| 2013/0023174 A1 | 1/2013 | Quinn et al. |
| 2013/0065803 A1 | 3/2013 | Hora et al. |
| 2013/0067861 A1 | 3/2013 | Turner |
| 2013/0211068 A1 | 8/2013 | Anderson et al. |
| 2014/0038485 A1 | 2/2014 | Anderson et al. |
| 2014/0051824 A1 | 2/2014 | Anderson et al. |
| 2014/0083328 A1 | 3/2014 | Lochel, Jr. et al. |
| 2015/0152244 A1 | 6/2015 | Herandez-Torres |

FOREIGN PATENT DOCUMENTS

| | | |
|---|---|---|
| CN | 102695684 | 10/2010 |
| CN | 101939268 | 1/2011 |
| EP | 44614 | 1/1982 |
| EP | 405921 | 1/1991 |
| EP | 1884526 | 2/2008 |
| EP | 2093266 | 8/2009 |
| EP | 1095977 | 5/2011 |
| FR | 2924719 | 6/2009 |
| GB | 865380 | 4/1961 |
| GB | 1293744 | 10/1972 |
| JP | 60-099180 | 6/1985 |
| JP | 2000-063782 | 2/2000 |
| WO | 93/015140 | 8/1993 |
| WO | 96/039364 | 12/1996 |
| WO | 99/039039 | 8/1999 |
| WO | 99/61538 | 12/1999 |
| WO | 02/02476 | 1/2002 |
| WO | 02/077038 | 10/2002 |
| WO | 02/096819 | 12/2002 |
| WO | 04/050978 | 6/2004 |
| WO | 06/120523 | 11/2006 |
| WO | 07/008412 | 1/2007 |
| WO | 08/011455 | 1/2008 |
| WO | 09/006532 | 1/2009 |
| WO | 09/019232 | 2/2009 |

(56) References Cited

FOREIGN PATENT DOCUMENTS

| WO | 09/034549 | 3/2009 |
|----|-----------|--------|
| WO | 09/046521 | 4/2009 |
| WO | 09/080696 | 7/2009 |
| WO | 2009/080938 | 7/2009 |
| WO | 2009/095617 | 8/2009 |
| WO | 10/029266 | 3/2010 |
| WO | 10/29266 | 3/2010 |
| WO | 10/120748 | 10/2010 |
| WO | 10/132641 | 11/2010 |
| WO | 10/135637 | 11/2010 |
| WO | 10/139899 | 12/2010 |
| WO | 2011/002730 | 1/2011 |
| WO | 11/044490 | 4/2011 |
| WO | 12/118939 | 9/2012 |

OTHER PUBLICATIONS

D. Pramanick et al., "Synthesis and biodegradation of copolyesters from citric acid and glycerol", Polymer Bulletin 19, pp. 365-370 (1988).
Ronald Alan Holser, "Thermal Analysis of Glycerol Citrate/Starch Blends", Journal of Applied Polymer Science, vol. 110, pp. 1498-1508 (2008).
Nagata et al., "Synthesis and enzymatic degradation of regular network aliphatic polyesters", Reactive & Functional Polymers 30 (1996) pp. 165-171.
Shi et al., "Characterizatino of citric acid/glycerol co-plasticized thermoplastic starch prepared by melt blending", Carbohydrate Polymers 69, pp. 748-755 (2007).
Pachauri et al., "Value-added Utilization of Crude Glycerol from Biodiesel Production: A Survey of Current Research Activities", An ASABE meeting Presentation, Portland, Oregon, Jul. 9-12, 2006, Paper No. 066223.
Voit et al., "Hyperbranched and Highly Branched Polymer Architectures—Synthetic Strategies and Major Characterization Aspects", Chem. Rev. 2009, 109, pp. 5924-5973.
Jan Trenkel-Amoroso, "Synthesis, Degradation and Practical Applications of Glycerol/Citric Acid Condensation Polymer", A Thesis submitted to Oregon State University, presented Dec. 9, 2008, 66 pgs.
Unal, "Synthesis and Characterization of Branched Macromolecules for High Performance Elastomers, Fibers, and Films, "Dissertation submitted to the Virginia Polytechnic Institute and State University, Nov. 16, 2005, 240 pages.
Reddy et al. "Wet Cross-Linking Gliadin Fibers with Citric Acid and a Quantitative Relationship between Cross-Linking Conditions and Mechanical Properties", J. Agric. Food Chem., vol. 57, No. 1, pp. 90-98, 2009.
Reddy et al., "Citric acid cross-linking of starch films", Food Chemistry, vol. 118, pp. 702-711, 2010.
Welch et al., "Curing Agents having low or zero phosphorus content for formaldehyde free DP Finishing with Polycarboxylic Acids", Textile Chemist and Colorist Journal, vol. 25, No. 10, Oct. 1993, pp. 25-29.
Clark M. Welch, "Formaldehyde-Free Durable Press Finishing", Surfactant Science Series, vol. 94, pp. 1-32, 2001.
Office action from U.S. Appl. No. 13/234,336 dated May 4, 2015.
Office action from U.S. Appl. No. 13/234,336 dated Dec. 15, 2015.
Office action from U.S. Appl. No. 14/110,079 dated Jan. 28, 2016.
Office action from U.S. Appl. No. 14/302,604 dated Jun. 29, 2015.
Office action from U.S. Appl. No. 14/302,604 dated Jan. 4, 2016.
Office action from U.S. Appl. No. 14/302,604 dated Jul. 12, 2016.
Office action from U.S. Appl. No. 14/487,152 dated Oct. 26, 2015.
Notice of Allowance from U.S. Appl. No. 14/487,152 dated May 6, 2016.
Office action from U.S. Appl. No. 14/487,152 dated Jul. 14, 2016.
Office action from U.S. Appl. No. 14/516,660 dated May 15, 2015.
Notice of Allowance from U.S. Appl. No. 14/516,660 dated Nov. 6, 2015.
Office action from U.S. Appl. No. 14/565,545 dated Apr. 22, 2016.
Office action from U.S. Appl. No. 14/565,545 dated Jul. 27, 2016.
Office action from Australian Application No. 2010303254 dated Oct. 10, 2014.
Patent Examination Report from Australian Application No. 2010303254 dated May 8, 2015.
Office action from Chinese Application No. 201110401232.4 dated Jan. 30, 2014.
Office action from Chinese Application No. 201110401232.4 dated Nov. 25, 2014.
Office action from Chinese Application No. 201080051943.7 dated Mar. 3, 2014.
Office action from Chinese Application No. 201080051943.7 dated Oct. 17, 2014.
Office action from Chinese Application No. 201080051943.7 dated Jun. 30, 2015.
Office action from Chinese Application No. 201280018294.X dated Aug. 29, 2014.
Office action from European Application No. 15152030.1 dated Apr. 8, 2015.
Communication from European Application No. 10768139.7 dated Apr. 7, 2015.
Search Report from European Application No. 15152030.1 dated Aug. 3, 2015.
Communication from the European Patent Office dated Aug. 16, 2005 regarding Serial No. 03768889.2.
Response to the European Patent Office dated Jul. 12, 2005 for Serial No. 03768889.2.
Communication from the European Patent Office dated Oct. 6, 2005 regarding Serial No. 03768889.2.
Response to the European Patent Office dated Feb. 3, 2006 for Serial No. 03768889.2.
Communication from European Application No. 15152030.1 dated Aug. 3, 2015.
Correspondence to the EPO from the Opponent/Respondent regarding Opposition to EP Application No. 03768889.2 (EP Patent No. 1578879) dated Feb. 14, 2013 from Opponent.
Communication from the EPO dated Nov. 8, 2012 regarding Summons to attend Oral Proceedings regarding Opposition to EP Application No. 03768889.2 (EP Patent No. 1578879).
Communication from the EPO dated Oct. 31, 2012 regarding Preparation for Oral Proceedings—Instructions to Support Service regarding Opposition to EP Application No. 03768889.2 (EP Patent No. 1578879).
Correspondence to the EPO dated Oct. 19, 2012 from the Patentee responding to communication dated Jun. 19, 2012 regarding Opposition to EP Application No. 03768889.2 (EP Patent No. 1578879).
Correspondence to the EPO dated Oct. 18, 2012 from the Opponent/Respondent responding to communication dated Jun. 19, 2012 regarding Opposition to EP Application No. 03768889.2 (EP Patent No. 1578879).
Communication from the EPO dated Jun. 19, 2012 regarding Opposition to EP Application No. 03768889.2 (EP Patent No. 1578879).
Correspondence to the EPO dated Jun. 1, 2012 from the Patentee regarding Opposition to EP Application No. 03768889.2 (EP Patent No. 1578879).
Communication from the Boards of Appeal of the European Patent Office regarding Decision dated Apr. 4, 2012 regarding Opposition to EP Application No. 03768889.2 (EP Patent No. 1578879).
Communication from the EPO regarding Minutes of the Public Oral Proceedings before the Technical Board of Appeal regarding Opposition to EP Application No. 03768889.2 (EP Patent No. 1578879).
Correspondence to the EPO dated Apr. 3, 2012 from the Patentee regarding response to submission of Mar. 20, 2012 by the Opponent/Respondent regarding Opposition to EP Application No. 03768889.2 (EP Patent No. 1578879).
Communication from the EPO dated Mar. 23, 2012 confirming Oral Proceeding date regarding Opposition to EP Application No. 03768889.2 (EP Patent No. 1578879).
Correspondence to the EPO dated Mar. 20, 2012 from the Opponent/Respondent regarding Opposition to EP Application No. 03768889.2 (EP Patent No. 1578879).

(56) References Cited

OTHER PUBLICATIONS

Correspondence to the EPO dated Mar. 2, 2012 from the Patentee regarding Opposition to EP Application No. 03768889.2 (EP Patent No. 1578879).
Correspondence to the EPO dated Mar. 1, 2012 from the Opponent/Respondent regarding Opposition to EP Application No. 03768889.2 (EP Patent No. 1578879).
Communication from the EPO dated Dec. 21, 2011 regarding Summons to Oral Proceedings regarding Opposition to EP Application No. 03768889.2 (EP Patent No. 1578879).
Correspondence to the EPO dated Nov. 2, 2012 from the Opponent/Respondent regarding Opposition to EP Application No. 03768889.2 (EP Patent No. 1578879).
Communication from the EPO dated Aug. 11, 2010 regarding Opposition to EP Application No. 03768889.2 (EP Patent No. 1578879).
Communication from the EPO dated Jul. 27, 2010 regarding Opposition to EP Application No. 03768889.2 (EP Patent No. 1578879).
Correspondence to the EPO dated Jul. 21, 2010 from the Patentee regarding Opposition to EP Application No. 03768889.2 (EP Patent No. 1578879).
Communication from the EPO dated Mar. 19, 2010 regarding Opposition to EP Application No. 03768889.2 (EP Patent No. 1578879).
Communication from the EPO dated Mar. 19, 2010 regarding minutes of Oral Proceedings for Opposition to EP Application No. 03768889.2 (EP Patent No. 1578879).
Correspondence to EPO dated Jan. 22, 2010 from Opponent/Respondent regarding Opposition to EP Application No. 03768889.2 (EP Patent No. 1578879).
Correspondence to the EPO dated Jan. 11, 2010 from Opponent/Respondent regarding Opposition to EP Application No. 03768889.2 (EP Patent No. 1578879).
Correspondence to the EPO dated Jan. 11, 2010 from the Patentee regarding Opposition to EP Application No. 03768889.2 (EP Patent No. 1578879).
Correspondence to the EPO dated Jan. 7, 2010 from the Patentee regarding Opposition to EP Application No. 03768889.2 (EP Patent No. 1578879).
Communication from the EPO dated Jul. 14, 2009 regarding Summons to attend Oral Proceedings for Opposition to EP Application No. 03768889.2 (EP Patent No. 1578879).
Correspondence to the EPO dated May 6, 2008 from the Patentee regarding Opposition to EP Application No. 03768889.2 (EP Patent No. 1578879).
Correspondence to the EPO dated Feb. 11, 2008 from the Patentee regarding Opposition to EP Application No. 03768889.2 (EP Patent No. 1578879).
Communication from the EPO dated Nov. 16, 2007 regarding a Notice of Opposition filing for Opposition to EP Application No. 03768889.2 (EP Patent No. 1578879).
Communication from the EPO dated Oct. 19, 2007 regarding a Notice of Opposition filing for Opposition to EP Application No. 03768889.2 (EP Patent No. 1578879).
Correspondence from Opponent/Respondent to the EPO dated Oct. 15, 2007 regarding Opposition to EP Application No. 03768889.2 (EP Patent No. 1578879).
Communication from the EPO dated Oct. 15, 2007 regarding Opposition to EP Application No. 03768889.2 (EP Patent No. 1578879).
Communication from the EPO dated May 20, 2010 regarding Opposition to EP Application No. 03768889.2 (EP Patent No. 1578879).
Office action from Japanese Application No. 2013-556848 dated May 8, 2015.
Office action from Japanese Application No. 2013-556848 dated Jul. 8, 2015.
Office action from Japanese Application No. 2013-556848 dated May 31, 2016.

About.com "Monomeric Unit", accessed Jun. 18, 2012, http://composite.about.com/library/glossary/m/bldef-m3521.htm.
Handbook of Adhesive Technology: Chapter 15—Carbohydrate Polymers as Adhesives, by Melissa Baumann and Anthony Conner, edited by A. Pizzi and K. Mittal, New York: Marcel Dekker, Inc. 1994.
American Chemical Society, Citric Acid, Jan. 30, 2014, 3 pgs.
Arch Chemicals, Building Products Biocide Selection Guide, Mar. 12, 2006.
Archimica, "Vinylphosphonic acid and vinylphosphonic dimethyl ester", version 1, 2009.
Alvatroni et al., "Maltodextrin molecular weight distribution influence on the glass transition temperature and viscosity in aqueous solutions", Carbohydrate Polymers, 58, pp. 323-334 (2004).
Blamire, John, "Science at a Distance", Science at a Distance, accessed Jun. 17, 2013, http://www.brooklyn.cuny.edu/bc/ahp/SDPS/SD.PS.polymers.html.
ChemSpider, D-Glucose, Jun. 18, 2013, 4 pages.
Dokic, et al., "Molecular characteristics of maltodextrins and rheological behaviour of diluted and concentrated solutions", Colloids and Surfaces, A: Physiocochemical and Engineering Aspects, 141, pp. 435-440 (1998).
Filton, "Rapid Determination of Dextrose Equivalent by Cryoscopy", Oct. 22, 2006, Starch, vol. 31, issue 11, pp. 381-384.
Kearsley, M, Physical and Chemical Properties of Glucose Syrups, Handbook of Starch Hydrolysis Products and their Derivatives, Chapman and Hall, 1995.
Kim et al., "Characterization of Poly(styrene-b-vinylbenzylphosphonic acid) Copolymer by Titration and Thermal Analysis", Macromolecular Research, 2007, vol. 15. No. 6, pp. 587-594.
Messina, M.J., "Legumes and soybeans: overview of their nutritional profiles and heath effects", Am. J. of clinical Nutrition, vol. 70, No. 3, pp. 439S-450S, Sep. 1999.
Signet Chemical, Glucidex Maltodextrin, Apr. 16, 2013.
"Physical Properties of Dextran", Pharmacosmos, www.dextran.net/dextran-physical-properties.html, website of Pharmacosmos A/S, Holbaek, Denmark, pp. 1-3, retrieved Sep. 11, 2012.
Soottitantawat et al., "Microencapsulation by Spray Drying: Influence of Emulsion Size on the Retention of Volatile Compounds", Food Engineering and Physical Properties, MS 20030050, Accepted May 31, 2003.
"Tate and Lyle STAR-DRI Maltodextrins & Corn Syrup Solids", manufacturer's literature, http://www.tate-lyle.co.uk, Tate & Lyle, Decatur, IL, Copyright 2005, hereinafter Tate & Lyle.
Declaration of Liang Chen signed May 9, 2013, 2 pgs.
Spectrus NX1100, two page fact sheet from GE Power & Water, Water & Process Technologies, Jul. 2010.
Office action from U.S. Appl. No. 12/825,375 dated Dec. 1, 2016.
Office action from U.S. Appl. No. 14/302,604 dated Nov. 3, 2016.
Office action from Canadian Application No. 2,777,078 dated Aug. 16, 2016 received on Oct. 7, 2016.
Chirife et al., "A Simple Model for Predicting the Viscosity of Sugar and Oligosaccharide Solutions", J. of Food Engineering 33, pp. 221-226 (1987).
International Search Report and Written Opinion from PCT/US10/030852 dated Aug. 25, 2010.
International Search Report and Written Opinion from PCT/US10/34670 dated Oct. 28, 2010.
International Search Report and Written Opinion from PCT/US10/040276 dated Oct. 1, 2010.
International Search Report and Written Opinion from PCT/US10/52028 dated Feb. 11, 2011
International Search Report and Written Opinion from PCT/US12/27226 dated Jun. 25, 2012.
International Search Report and Written Opinion from PCT/US12/32118 dated Sep. 11, 2012.
Office action from U.S. Appl. No. 12/758,910 dated Dec. 3, 2012.
Office action from U.S. Appl. No. 12/758,910 dated May 6, 2013.
Office action from U.S. Appl. No. 12/776,703 dated Oct. 5, 2012.
Office action from U.S. Appl. No. 12/776,703 dated Oct. 6, 2014.
Office action from U.S. Appl. No. 12/776,703 dated May 2, 2013.
Office action from U.S. Appl. No. 12/776,703 dated Aug. 15, 2013.

(56) References Cited

OTHER PUBLICATIONS

Office action from U.S. Appl. No. 12/776,703 dated Mar. 20, 2014.
Office action from U.S. Appl. No. 12/825,375 dated Oct. 9, 2012.
Office action from U.S. Appl. No. 12/825,375 dated May 23, 2013.
Office action from U.S. Appl. No. 12/825,375 dated Sep. 12, 2013.
Office action from U.S. Appl. No. 12/825,375 dated Apr. 24, 2014.
Office action from U.S. Appl. No. 12/825,375 dated Feb. 13, 2015.
Office action from U.S. Appl. No. 12/825,375 dated Oct. 23, 2015.
Office action from U.S. Appl. No. 12/825,375 dated Apr. 7, 2016.
Office action from U.S. Appl. No. 12/900,540 dated Nov. 29, 2012.
Interview Summary from U.S. Appl. No. 12/900,540 dated Feb. 15, 2013.
Office action from U.S. Appl. No. 12/900,540 dated May 9, 2013.
Office action from U.S. Appl. No. 12/900,540 dated Jul. 5, 2013.
Office action from U.S. Appl. No. 12/900,540 dated Feb. 12, 2014.
Office action from U.S. Appl. No. 12/900,540 dated Jul. 15, 2014.
Notice of Allowance from U.S. Appl. No. 12/900,540 dated Sep. 8, 2014.
Office action from U.S. Appl. No. 13/026,415 dated Feb. 1, 2013.
Office action from U.S. Appl. No. 13/026,415 dated Jul. 18, 2013.
Office action from U.S. Appl. No. 13/026,415 dated Feb. 10, 2014.
Office action from U.S. Appl. No. 13/026,415 dated Jul. 15, 2014.
Office action from U.S. Appl. No. 13/026,415 dated Jan. 13, 2015.
Office action from U.S. Appl. No. 13/026,415 dated Jun. 3, 2015.
Office action from U.S. Appl. No. 13/026,415 dated Dec. 2, 2015.
Office action from U.S. Appl. No. 13/026,415 dated Apr. 20, 2016.
Notice of Allowance from U.S. Appl. No. 13/026,415 dated Jul. 20, 2016.
Office action from U.S. Appl. No. 13/037,725 dated Oct. 15, 2012.
Interview Summary from U.S. Appl. No. 13/037,725 dated Feb. 15, 2013.
Office action from U.S. Appl. No. 13/037,725 dated May 9, 2013.
Office action from U.S. Appl. No. 13/037,725 dated Jul. 5, 2013.
Office action from U.S. Appl. No. 13/187,650 dated May 3, 2013.
Office action from U.S. Appl. No. 13/187,650 dated Nov. 26, 2013.
Office action from U.S. Appl. No. 13/187,650 dated Mar. 7, 2014.
Office action from U.S. Appl. No. 13/187,650 dated Nov. 6, 2014.
Office action from U.S. Appl. No. 13/87,650 dated Mar. 20, 2015.
Office action from U.S. Appl. No. 13/187,650 dated Nov. 16, 2015.
Office action from U.S. Appl. No. 13/187,650 dated Mar. 28, 2016.
Office action from U.S. Appl. No. 13/187,650 dated Jul. 13, 2016.
Office action from U.S. Appl. No. 13/234,336 dated Jul. 17, 2014.
Office action from U.S. Appl. No. 13/234,336 dated Jan. 14, 2015.
Corrected Notice of Allowability from U.S. Appl. No. 13/026,415 dated Feb. 17, 2017.
Advisory Action from U.S. Appl. No. 13/187,650 dated Apr. 20, 2017.
Office action from U.S. Appl. No. 12/825,375 dated Nov. 16, 2017.
Notice of Allowance from U.S. Appl. No. 13/026,415 dated Dec. 28, 2016.
Office action from U.S. Appl. No. 13/187,650 dated Jan. 25, 2017.
Office action from U.S. Appl. No. 13/187,650 dated May 24, 2017.
Notice of Allowance from U.S. Appl. No. 13/187,650 dated Dec. 27, 2017.
Notice of Allowance from U.S. Appl. No. 14/487,152 dated Oct. 24, 2016.
Supplemental Notice of Allowance from U.S. Appl. No. 14/487,152 dated Dec. 14, 2016.
Office action from Canadian Application No. 2,828,566 dated Jan. 30, 2018.
Office action from Korean Application No. 10-2013-7025860 dated Feb. 23, 2018.
Potter et al. "Starch. II. Molecular Weights of Amyloses and Amylopectins from Starches of Various Plant Origins", vol. 70, pp. 3774-3777, Nov. 1948.
Office action from Japanese Application No. 2016-197000 dated Feb. 26, 2018.
Office action from U.S. Appl. No. 15/230,721 dated Apr. 23, 2018.
Office action from European Application No. 15152030.1 dated Mar. 16, 2018.

BIO-BASED BINDERS INCLUDING CARBOHYDRATES AND A PRE-REACTED PRODUCT OF AN ALCOHOL OR POLYOL AND A MONOMERIC OR POLYMERIC POLYCARBOXYLIC ACID

RELATED APPLICATIONS

This application is a divisional application of U.S. Ser. No. 14/110,079, filed Oct. 4, 2013, titled BIO-BASED BINDERS INCLUDING CARBOHYDRATES AND A PRE-REACTED PRODUCT OF AN ALCOHOL OR POLYOL AND A MONOMERIC OR POLYMERIC POLYCARBOXYLIC ACID, which is a section 371 national-stage phase of International Application No. PCT/US2012/032118, filed 4 Apr. 2012, titled BIO-BASED BINDERS INCLUDING CARBOHYDRATES AND A PRE-REACTED PRODUCT OF AN ALCOHOL OR POLYOL AND A MONOMERIC OR POLYMERIC POLYCARBOXYLIC ACID, which claims priority to U.S. Application Ser. No. 61/473,043, filed 7 Apr. 2011, titled BIO-BASED BINDERS INCLUDING CARBOHYDRATES AND A PRE-REACTED PRODUCT OF AN ALCOHOL OR POLYOL AND A MONOMERIC OR POLYMERIC POLYCARBOXYLIC ACID, the entire disclosures of which are hereby incorporated by reference in their entirety.

The present invention relates generally to rotary fiber insulation and non-woven mats, and more particularly, to a binder for use in manufacturing both fiberglass insulation and non-woven mats that is bio-based, preferably containing no added formaldehyde, and is environmentally friendly.

BACKGROUND OF THE INVENTION

Conventional fibers are useful in a variety of applications including reinforcements, textiles, and acoustical and thermal insulation materials. Although mineral fibers (e.g., glass fibers) are typically used in insulation products and non-woven mats, depending on the particular application, organic fibers such as polypropylene, polyester, and multi-component fibers may be used alone or in combination with mineral fibers in conning the insulation product or non-woven mat.

Fibrous insulation is typically manufactured by fiberizing a molten composition of polymer, glass, or other mineral and spinning fine fibers from a fiberizing apparatus, such as a rotating spinner. To form an insulation product, fibers produced by the rotating spinner are drawn downwardly from the spinner towards a conveyor by a blower. As the fibers move downward, a binder material is sprayed onto the fibers and the fibers are collected into a high loft, continuous blanket on the conveyor. The binder material gives the insulation product resiliency for recovery after packaging and provides stiffness and handleability so that the insulation product can be handled and applied as needed in the insulation cavities of buildings. The binder composition also provides protection to the fibers from interfilament abrasion and promotes compatibility between the individual fibers.

The blanket containing the binder-coated fibers is then passed through a curing oven and the binder is cured to set the blanket to a desired thickness. After the binder has cured, the fiber insulation may be cut into lengths to form individual insulation products, and the insulation products may be packaged for shipping to customer locations. One typical insulation product produced is an insulation batt or blanket, which is suitable for use as wall insulation in residential dwellings or as insulation in the attic and floor insulation cavities in buildings. Another common insulation product is air-blown or loose-fill insulation, which is suitable for use as sidewall and attic insulation in residential and commercial buildings as well as in any hard-to-reach locations. Loose-fill insulation is formed of small cubes that are cut from insulation blankets, compressed, and packaged in bags.

Non-woven mats may be formed by conventional wet-laid processes. For example, wet chopped fibers are dispersed in a water slurry that contains surfactants, viscosity modifiers, defoaming agents, and/or other chemical agents. The slurry containing the chopped fibers is then agitated so that the fibers become dispersed throughout the slurry. The slurry containing the fibers is deposited onto a moving screen where a substantial portion of the water is removed to form a web. A binder is then applied, and the resulting mat is dried to remove any remaining water and cure the binder. The formed non-woven mat is an assembly of dispersed, individual glass filaments.

Various attempts have been made to reduce undesirable formaldehyde emissions from formaldehyde-based resins. For example, various formaldehyde scavengers such as ammonia and urea have been added to the formaldehyde-based resin in an attempt to reduce formaldehyde emission from the insulation product. Because of its low cost, urea is added directly to the uncured resin system to act as a formaldehyde scavenger. The addition of urea to the resin system produces urea-extended phenol-formaldehyde resole resins. These resole resins can be further treated or applied as a coating or binder and then cured. Unfortunately, the urea-extended resoles are unstable, and because of this instability, the urea-extended resoles must be prepared on site. In addition, the binder inventory must be carefully monitored to avoid processing problems caused by undesired crystalline precipitates of dimer species that may form during storage. Ammonia is not a particularly desirable alternative to urea as a formaldehyde scavenger because ammonia generates an unpleasant odor and may cause throat and nose irritation to workers. Further, the use of a formaldehyde scavenger in general is undesirable due to its potential adverse affects to the properties of the insulation product, such as lower recovery and lower stiffness.

In addition, previous arts have focused on the use of polyacrylic acid with a polyhydroxy crosslinking agent or carbohydrate-based chemistry that is linked to the Maillard reaction. A binder that is formed mostly of polyacrylic acid inherently has problems due to its acidity and associated corrosion of machine parts. In addition, polyacrylic acid binders have a high viscosity, high curing temperatures, and high associated curing costs. Further, the Maillard-based products have an undesirable dark brown color after curing. Also, the use of large amounts of ammonia needed to make the binder presents a safety risk and possible emission problems.

Alternative polymeric binder systems to those described above for fibrous glass products have also been proposed. However, these alternative binder systems remain problematic. For example, low molecular weight, low viscosity binders which allow maximum vertical expansion of the insulation pack in the transfer zone generally cure to form a non-rigid plastic matrix in the finished product, thereby reducing the attainable vertical height recovery of the finished insulation product when installed. Conversely, high viscosity binders, which generally cure to form a rigid matrix in the finished product, do not allow the desired maximum vertical expansion of the coated, uncured pack.

In view of the existing problems with current binders, there remains a need in the art for a binder system that does not corrode machine parts, does not emit formaldehyde, and which is environmentally friendly.

SUMMARY OF THE INVENTION

In one embodiment the present invention provides a binder composition for use in the formation of fiberglass insulation and non-woven chopped strand mats that includes at least one carbohydrate from natural sources, at least one crosslinking agent, and a pre-reacted product of an alcohol or polyol and a monomeric or polymeric polycarboxylic acid. The carbohydrate and crosslinking agent form a polyester thermoset resin. In some aspects, the carbohydrate may have a dextrose equivalent (DE) from 2 to 20. Additionally, the carbohydrate may be a water-soluble polysaccharide selected from pectin, dextrin, maltodextrin, starch, modified starch, starch derivatives, cellulose and combinations thereof. The alcohol or polyol includes compounds such as aliphatic alcohols (i.e., $CH_3(CH_2)_nCH_2OH$ where n=2-16), glycerol, triethanolamine, ethylene glycol, polyethylene glycol, and pentaerythritol. The crosslinking agent may be any monomeric or polymeric polycarboxylic acid and/or their corresponding salts. In addition, the binder composition may include a coupling agent, a moisture resistant agent, a dust suppression agent, a catalyst, an inorganic acid or base, and/or an organic acid or base. The binder composition is free of added formaldehyde and is environmentally friendly.

In another embodiment the present invention provides a fibrous insulation product that includes a plurality of randomly oriented fibers and a binder composition applied to at least a portion of the fibers and interconnecting the fibers. The binder includes at least at least one carbohydrate from natural sources, at least one crosslinking agent, and a pre-reacted product of an alcohol or polyol and a monomeric or polymeric polycarboxylic acid. In some aspects the carbohydrate may have a dextrose equivalent (DE) from 2 to 20. Additionally, the carbohydrate may be a water-soluble polysaccharide selected from pectin, dextrin, maltodextrin, starch, modified starch, starch derivatives, cellulose, and combinations thereof. The binder composition may also include one or more members selected from a coupling agent, a moisture resistant agent, a dust suppression agent, a catalyst, an inorganic acid or base, and an organic acid or base. In exemplary embodiments, the crosslinking agent includes any monomeric or polymeric polycarboxylic acid and/or their corresponding salts In yet another embodiment the present invention provides a non-woven chopped strand mat formed of a plurality of randomly oriented glass fibers having a discrete length enmeshed in the form of a mat having a first major surface and a second major surface and a polyester binder composition at least partially coating the first major surface of the mat. The binder includes (1) at least one carbohydrate from natural sources preferably having a dextrose equivalent from 2 to 20, (2) at least one crosslinking agent, and (3) a pre-reacted product of an alcohol or polyol and a monomeric or polymeric polycarboxylic acid. The binder composition may also include one or more members selected from a coupling agent, a moisture resistant agent, a dust suppression agent, a catalyst, an inorganic acid or base, and an organic acid or base. In at least one exemplary embodiment, the carbohydrate is a water-soluble polysaccharide selected from pectin, dextrin, maltodextrin, starch, modified starch, starch derivatives, cellulose, and combinations thereof. In addition, the crosslinking agent may be selected from polycarboxylic acids, salts of polycarboxylic acid, anhydrides, esters, monomeric and polymeric aldehydes, monomeric and polymeric polycarboxylic acid with anhydride, citric acid, salts of citric acid, adipic acid, salts of adipic acid, polyacrylic acid, salts of polyacrylic acid, polyacrylic acid based resins, proteins, and combinations thereof. The binder may have a light color upon curing, is environmentally friendly, and is free of added formaldehyde.

In some aspects of the invention, the pre-reacted product is a composition that includes (i) about 5 wt % to about 25 wt % glycerol; (ii) about 10 wt % to about 70 wt % mixture of monoglyceryl citrate, diglyceryl citrate and triglyceryl citrate; and (iii) less than 5 wt % citric acid. In some aspects, the composition includes about 12 wt % to about 50 wt % mixture of monoglyceryl citrate, diglyceryl citrate and triglyceryl citrate. In still other aspects, the composition includes about 20 wt % to about 40 wt % mixture of monoglyceryl citrate, diglyceryl citrate and triglyceryl citrate. In some aspects, the composition further includes about 25 wt % to about 80 wt % other higher molecular weight citric acid-derived esters. In at least one exemplary aspect, the pre-reacted product has a weight average molecular weight of from about 1500 to about 5000 Daltons. In some aspects, the composition may include a Group I metal cation or a citrate anion or both. In these aspects, the molar ratio of the Group I metal cation to total citric acid, citrate anion, and citric acids esters of the pre-reacted product is from about 1:99 to 25:75. In other aspects, the molar ratio of the Group I metal cation to total citric acid, citrate anion, and citric acid esters of the pre-reacted product is from about 3:99 to 10:99.

In still other aspects of the invention, the pre-reacted product is a composition that includes (i) about 5 wt % to about 25 wt % glycerol based on the weight of the composition; (ii) about 10 wt % to about 70 wt % mixture of monoglyceryl citrate, diglyceryl citrate and triglyceryl citrate based on the weight of the composition; and (iii) a Group I metal cation or a citrate anion or both, wherein the molar ratio of the cation to total citric acid, citrate anion, and citric acids esters of the composition is from about 1:99 to 25:75. In other embodiments, the molar ratio of the Group I metal cation to total citric acid, citrate anion, and citric acid esters of the composition is from about 3:99 to 10:99. In some aspects, the composition includes about 12 wt % to about 50 wt % mixture of monoglyceryl citrate, diglyceryl citrate and triglyceryl citrate. In still other aspects, the composition includes about 20 wt % to about 40 wt % mixture of monoglyceryl citrate, diglyceryl citrate and triglyceryl citrate. In some aspects, the composition further includes about 25 wt % to about 80 wt % other higher molecular weight citric acid-based esters based on the weight of the composition.

In yet other aspect of the present invention, the pre-reacted product is made by a method comprising the steps of (i) heating a mixture of glycerol and citric acid in a molar ratio from about 1.5 moles glycerol:1 moles citric acid to less than 3 moles glycerol:1 mole citric acid at a temperature of about 115° C. to about 145° C.; and (ii) reacting the mixture from step (i) to obtain a pre-reacted product that includes (a) from about 5 wt % to about 25 wt % glycerol based on the weight of the pre-reacted product; (b) from about 10 wt % to about 70 wt % monoglyceryl citrate, diglyceryl citrate, and triglyceryl citrate based on the weight of the pre-reacted product and; (c) less than 5 wt % unreacted citric acid based on the weight of the pre-reacted product. In some aspects, the composition includes about 12 wt % to about 50 wt % mixture of monoglyceryl citrate, diglyceryl citrate and triglyceryl citrate. In still other aspects, the composition includes about 20 wt % to about 40 wt % mixture of monoglyceryl citrate, diglyceryl citrate and triglyceryl citrate. In some aspects the pre-reacted product includes from about 25 wt % to about 80 wt % citric acid-derived esters. In some aspects the pre-reacted product may include a Group I metal cation or a citrate anion or both.

In another aspect the pre-reacted product of the invention is made by a method that includes the steps of (i) heating a mixture of glycerol and citric acid in a molar ratio from about 1.5 to less than about 3 moles glycerol:1 mole citric acid at a temperature of about 115° C. to about 145° C.; and (ii) reacting the mixture from step (i) to obtain a reaction product comprising (a) from about 5 wt % to about 25 wt % glycerol based on the weight of the pre-reacted product; b) from about 10 wt % to about 70 wt % a mixture of monoglyceryl citrate, diglyceryl citrate, and triglyceryl citrate; and (c) less than 5 wt % unreacted citric acid based on the weight of pre-reacted product. In some aspects, the composition includes about 12 wt % to about 50 wt % mixture of monoglyceryl citrate, diglyceryl citrate and triglyceryl citrate. In still other aspects, the composition includes about 20 wt % to about 40 wt % mixture of monoglyceryl citrate, diglyceryl citrate and triglyceryl citrate. In some aspects, the method includes quenching the reaction with water or an aqueous sodium hydroxide solution. In still other aspects, the method includes adding hydroxide formed from a Group I metal cation or a citrate anion or both such as, for example, tri-sodium citrate, to the mixture before the reaction takes place.

In certain preferred aspects of the above embodiments, the polyol (e.g. glycerol) contains less than 500 ppm chloride ions. In other preferred aspects, the polyol contains less than 300 ppm, less than 200 ppm, less than 100 ppm, less than 70 ppm, or less than 50 ppm chloride ions. Reduced chloride ions concentrations may minimize corrosion concerns in products that incorporate a composition using a pre-reacted product of the present invention. In other preferred aspects of the above embodiments, the polyol is technical grade or USP glycerol.

It is an advantage of the present invention that the carbohydrate may be obtained from natural and renewable sources.

It is another advantage of the present binder that the use of the pre-reacted product form an alcohol or polyol with a monomeric or polymeric carboxylic acid helps to speed the crosslinking reaction, induces faster water evaporation, decreases the viscosity of the binder, helps to reduce the amount of water needed for application of the binder, decreases tackiness, and helps to achieve a maximum vertical expansion of the insulation pack in the transfer zone.

It is yet another advantage of the present invention that carbohydrates (e.g., maltodextrin) are readily available and are low in cost.

It is a further advantage of the present invention that insulation products and non-woven mats utilizing the inventive binder composition can be manufactured using current manufacturing lines, thereby saving time and money.

It is another advantage of the present invention that the binder composition does not require added formaldehyde.

It is also an advantage of the present invention that the final insulation product has a light color at low LOIs that allows the use of dyes, pigments, or other colorants to yield a variety of colors for the insulation product.

It is a feature of the present invention that the carbohydrate (e.g., maltodextrin) can form an aqueous mixture that can be applied by conventional binder applicators, including spray applicators.

It is also a feature of the invention that the inventive binder composition can be useful for composite reinforcements, such as chopped strands, for use in thermoplastics, thermosets, and roofing applications. In addition, the inventive binders may be used in both single and multi-end rovings.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION

Figure 1:
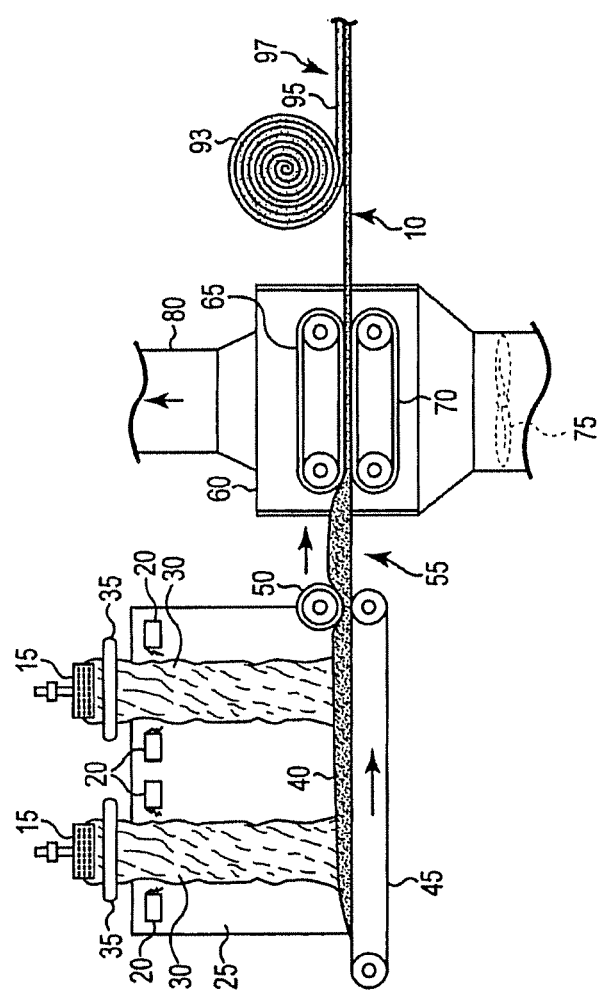
FIG. 1 is a schematic illustration of the formation of a faced insulation product with the inventive binder composition according to one exemplary embodiment.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

In the drawings, the thickness of the lines, layers, and regions may be exaggerated for clarity. It will be understood that when an element such as a layer, region, substrate, or panel is referred to as being "on" another element, it can be directly on the other element or intervening elements may also be present. Also, when an element is referred to as being "adjacent" to another element, the element may be directly adjacent to the other element or intervening elements may be present. The terms "top", "bottom", "side", and the like are used herein for the purpose of explanation only. Like numbers found throughout the figures denote like elements. It is to be noted that the phrase "binder", "bio-based binder", "binder composition", and "binder formulation" may be used interchangeably herein.

The present invention relates to environmentally friendly, aqueous polyester binder compositions that contain at least one bio-based component. In one exemplary embodiment, the bio-based component is a carbohydrate and the binder and includes a carbohydrate, a crosslinking agent, and a pre-reacted product of an alcohol or polyol (e.g., glycerol) and a monomeric or polymeric polycarboxylic acid. In some exemplary embodiments the carbohydrate-based binder composition also includes one or more of a coupling agent, a moisture resistant agent, a dust suppression agent, a catalyst, an inorganic acid or base, and/or an organic acid or base. Additionally, at low LOIs, the binder has a light (e.g., white or tan) color after it has been cured. The binder may be used in the formation of insulation materials and non-woven chopped strand mats. In addition, the binder is free of added formaldehyde. The inventive binder may also be useful in forming particleboard, plywood, and/or hardboards.

In one or more exemplary embodiment, the binder includes at least one carbohydrate that is from natural and renewable resources. For instance, the carbohydrate may be derived from plant sources such as legumes, maize, corn, waxy corn, sugar cane, milo, white milo, potatoes, sweet potatoes, tapioca, rice, waxy rice, peas, sago, wheat, oat, barley, rye, amaranth, and/or cassava, as well as other plants that have a high starch content. The carbohydrate polymer may also be derived from crude starch or cellulose-containing products derived from plants that contain residues of proteins, polypeptides, lipids, and low molecular weight carbohydrates. The carbohydrate may be selected from monosaccharides (e.g., xylose, glucose, and fructose), disaccharides (e.g., sucrose, maltose, and lactose), oligosaccharides (e.g., glucose syrup and fructose syrup), and polysaccharides and water-soluble polysaccharides (e.g., pectin, dextrin, maltodextrin, starch, modified starch, and starch derivatives).

The carbohydrate polymer may have a number average molecular weight from about 1,000 to about 8,000. Additionally, the carbohydrate polymer may have a dextrose equivalent (DE) number from 2 to 20, from 7 to 11, or from 9 to 14. The carbohydrates beneficially have a low viscosity and cure at moderate temperatures (e.g., 80-250° C.) alone or with additives. The low viscosity enables the carbohydrate to be utilized in a binder composition. In exemplary embodiments, the viscosity of the carbohydrate may be lower than 500 cps at 50% concentration and between 20 and 30° C. The use of a carbohydrate in the inventive binder composition is advantageous in that carbohydrates are readily available or easily obtainable and are low in cost. In at least one exemplary embodiment, the carbohydrate is a water-soluble polysaccharide such as dextrin or maltodextrin. The carbohydrate polymer may be present in the binder composition in an amount from about 30% to about 95% by weight of the total solids in the binder composition, from about 40% to about 80% by weight, or from about 50% to about 70% by weight. As used herein, % by weight indicates % by weight of the total solids in the binder composition.

Another component of the binder composition is a coupling agent. In at least one exemplary embodiment, the coupling agent is a silane coupling agent. The coupling agent(s) may be present in the polyester binder composition in an amount from about 0.01% to about 5.0% by weight of the total solids in the binder composition, from about 0.01% to about 2.5% by weight, or from about 0.1% to about 0.5% by weight. Non-limiting examples of silane coupling agents that may be used in the binder composition may be characterized by the functional groups alkyl, aryl, amino, epoxy, vinyl, methacryloxy, ureido, isocyanato, and mercapto. In exemplary embodiments, the silane coupling agent(s) include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., 3-aminopropyl-triethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In one or more exemplary embodiment, the silane is an aminosilane, such as γ-aminopropyltriethoxysilane.

Further exemplary coupling agents (including silane coupling agents) suitable for use in the binder composition are set forth below:

Acryl: 3-acryloxypropyltrimethoxysilane; 3-acryloxypropyltriethoxysilane; 3-acryloxypropylmethyldimethoxysilane; 3-acryloxypropylmethyldiethoxysilane; 3-methacryloxypropyltrimethoxysilane; 3-methacryloxypropyltriethoxysilane Amino: aminopropylmethyldimethoxysilane; aminopropyltriethoxysilane; aminopropyltrimethoxysilane/EtOH; aminopropyltrimethoxysilane; N-(2-aminoethyl)-3-aminopropyltrimethoxysilane; N-(2-aminoethyl)-3-aminopropylmethyldimethoxysilane; (2-aminoethyl)-(2-aminoethyl) 3-aminopropyltrimethoxysilane; N-phenylaminopropyltrimethoxysilane Epoxy: 3-Glycidoxypropylmethyldiethoxysilane; 3-glycidoxypropylmethyldimethoxysilane; 3-glycidoxypropyltriethoxysilane; 2-(3,4-eoxycyclohexyl)ethylmethyldimethoxysilane; 2-(3,4-epoxycyclohexyl) ethylmethyldiethoxysilane; 2-(3,4-epoxycyclohexyl) ethyltrimethoxysilane; 2-(3,4-Epoxycyclohexyl) ethyltriethoxysilane Mercapto: 3-mercaptopropyltrimethoxysilane; 3-Mercaptopropyltriethoxysilane; 3-mercaptopropylmethyldimethoxysilane; 3-Mercaptopropylmethyldiethoxysilane Sulfide: bis[3-(triethoxysilyl)propyl]-tetrasulfide; bis[3-(triethoxysilyl)propyl]-disulfide Vinyl: vinyltrimethoxysilane; vinyltriethoxysilane; vinyl tris(2-methoxyethoxy)silane; vinyltrichlorosilane; trimethylvinylsilane Alkyl: methyltrimethoxysilane; methyltriethoxysilane; dimethyldimethoxysilane; dimethyldiethoxysilane; tetramethoxysilane; tetraethoxysilane; ethyltriethoxysilane; n-propyltrimethoxysilane; n-propyltriethoxysilane; isobutyltrimethoxysilane; hexyltrimethoxysilane; hexyltriethoxysilane; octyltrimethoxysilane; decyltrimethoxysilane; decyltriethoxysilane; octyltriethoxysilane; tert-butyldimethylchlorosilane; cyclohexylmethyldimethoxysilane; dicylohexyldimethoxysilane; cyclohexylethyldimethoxysilane; t-butylmethyldimethoxysilane Chloroalkyl: 3-chloropropyltriethoxysilane; 3-chloropropyltrimethoxysilane; 3-chloropropylmethyldimethoxysilane Perfluoro: decafluoro-1,1,2,2-tetrahydrodecyl)trimethoxysilane; ((heptadecafluoro-1,1,2,2-tetrahydrodecyl) trimethoxysilane Phenyl: phenyltrimethoxysilane; phenyltriethoxysilane; diphenyldiethoxysilane; diphenyldimethoxysilane; diphenyldichlorosilane Hydrolyzates of the silanes listed above Zirconates: zirconium acetylacetonate; zirconium methacrylate Titanates: tetra-methyl titanate; tetra-ethyl titanate; tetra-n-propyl titanate; tetra-isopropyl titanate; tetra-isobutyl titanate; tetra-sec-butyl titanate; tetra-tert-butyl titanate; mono n-butyl, trimethyl titanate; mono ethyl tricyclohexyl titanate; tetra-n-amyl titanate; tetra-n-hexyl titanate; tetra-cyclopentyl titanate; tetra-cyclohexyl titanate; tetra-n-decyl titanate; tetra n-dodecyl titanate; tetra(2-ethyl hexyl) titanate; tetra octylene glycol titanate ester; tetrapropylene glycol titanate ester; tetra benzyl titanate; tetra-p-chloro benzyl titanate; tetra 2-chloroethyl titanate; tetra 2-bromoethyl titanate; tetra 2-methoxyethyl titanate; tetra 2-ethoxyethyl titanate.

Especially suitable titanate ester stabilizers of the invention are proprietary titanate ester compositions manufactured under the trade name Tyzor® by DuPont de Nemours & Co., Inc. Non-limiting examples include Tyzor® titanate esters sold in the 100% form rather than as solutions, e.g., in a lower aliphatic alcohol, such as Tyzor® TBT (tetrabutyl titanate), Tyzor® TPT (tetraisopropyl titanate), and Tyzor® OG (tetraoctylene glycol titanate ester).

In addition, the polyester binder composition contains a crosslinking agent. The crosslinking agent may be any compound suitable for crosslinking the carbohydrate. In exemplary embodiments, the crosslinking agent has a number average molecular weight greater than 90, from about 90 to about 10,000, or from about 190 to about 4,000. In some exemplary embodiments, the crosslinking agent has a number average molecular weight less than about 1000. Non-limiting examples of suitable crosslinking agents include polycarboxylic acids (and salts thereof), anhydrides, monomeric and polymeric polycarboxylic acid with anhydride (i.e., mixed anhydrides), citric acid (and salts thereof, such as ammonium citrate), 1,2,3,4-butane tetracarboxylic acid, adipic acid (and salts thereof), polyacrylic acid (and salts thereof), and polyacrylic acid based resins such as QXRP 1734 and Acumer 9932, both commercially available from The Dow Chemical Company. In exemplary embodiments, the crosslinking agent may be any monomeric or polymeric polycarboxylic acid, citric acid, and their corresponding salts. The crosslinking agent may be present in the binder composition in an amount up to about 40% by weight of the binder composition. In exemplary embodiments, the crosslinking agent may be present in the binder composition in an amount from about 5.0% to about 40% by weight of the total solids in the binder composition, from about 10% to about 40% by weight, or from about 20% to about 35% by weight.

In addition, the binder composition may include a pre-reacted product of an alcohol or polyol and a monomeric or polymeric polycarboxylic acid. The alcohol or polyol includes, but is not restricted to, compounds such as aliphatic alcohols (i.e., $CH_3(CH_2)_nCH_2OH$ where n=2-16), aromatic alcohols, glycerol, polyglycerol, triethanolamine, sorbitol, ethylene glycol, propylene glycol, polyethylene glycol, and pentaerythritol. The pre-reacted product of an alcohol or polyol and a monomeric or polymeric polycarboxylic acid may be present in the binder composition in an amount from about 5% to about 60% by weight, from about 10% to about 40% by weight, or from about 10% to about 30% by weight.

The pre-reacted product may be a composition that includes (i) about 5 wt % to about 25 wt % glycerol based on the weight of the composition; (ii) about 20 wt % to about 70 wt % mixture of monoglyceryl citrate, diglyceryl citrate and triglyceryl citrate based on the weight of the composition; and (iii) less than 5 wt % citric acid based on the weight of the composition. In some aspects, the pre-reacted product has a weight average molecular weight of from about 1500 to about 5000 Daltons. The pre-reacted product may have a viscosity of less than about 250 cP at 130° C., or less than about 200 cP at 130° C. In some aspects, the composition may include a Group I metal cation or a citrate anion or both. In these aspects, the molar ratio of the Group I metal cation to total citric acid, citrate anion, and glycerol-citric acid esters in the pre-reacted product is from about 1:99 to 25:75. In other aspects, the molar ratio of the Group I metal cation to total citric acid, citrate anion, and glycerol-citric acid esters in the pre-reacted product is from about 3:99 to 10:99. In some embodiments, the composition may include about 25 wt % to about 80% higher molecular weight citric acid-based esters. Suitable pre-reacted products are reported in U.S. Application No 61/472,999 titled "Bio-based Pre-reacted Product of a Polyol and a Monomeric or Polymeric Polycarboxylic Acid" filed Apr. 7, 2011 and incorporated herein for the purposes of describing pre-reacted products that may be suitable for use in the present invention.

In other aspects, the pre-reacted product may be a composition that includes (i) about 5 wt % to about 25 wt % glycerol based on the weight of the composition; (ii) about 20 wt % to about 70 wt % mixture of monoglyceryl citrate, diglyceryl citrate and triglyceryl citrate based on the weight of the composition; and (iii) a Group I metal cation or a citrate anion or both, wherein the molar ratio of the cation to total citric acid, citrate anion, monoglyceryl citrate, diglyceryl citrate and triglyceryl citrate in the pre-reacted product is from about 1:99 to 25:75. In still other aspects, wherein the molar ratio of the cation to total citric acid, citrate anion, monoglyceryl citrate, diglyceryl citrate and triglyceryl citrate in the pre-reacted product is from about 3:99 to 10:99.

Figure 5:
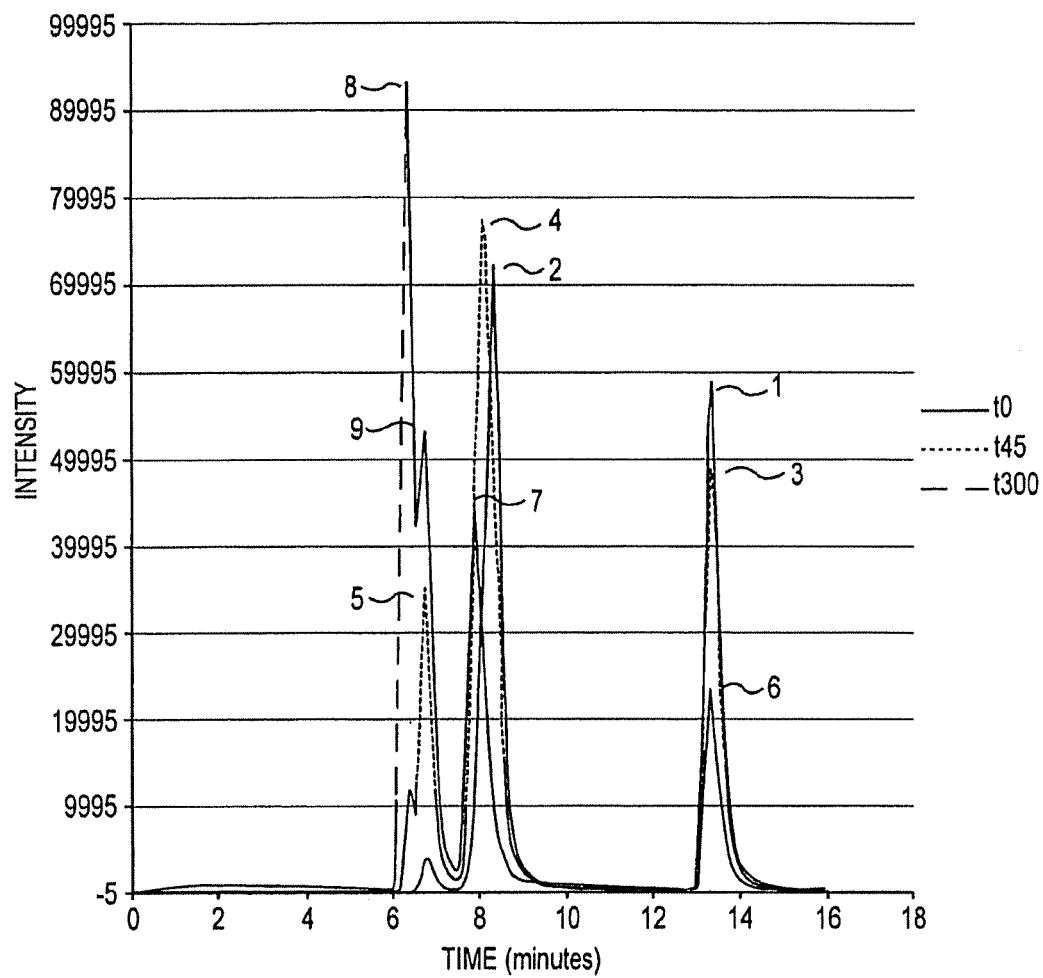
FIG. 5 is a graphical illustration of the formation of a pre-reacted product where glycerol and citric acid react to provide monoglyceryl citrate, diglyceryl citrate, triglyceryl citrate and other higher molecular weight citric acid-derived esters.

The pre-reacted product typically is made by heating a mixture of glycerol and citric acid in a molar ratio from about 1.5 moles glycerol:1 moles citric acid to less than 3 moles glycerol:1 moles citric acid at a temperature of about 115° C. to about 145° C. The mixture of glycerol and citric acid may be heated under vacuum, at ambient pressures, or under pressure in a sealed reaction vessel. FIG. 5 provides a graphical illustration of the formation of a pre-reacted product made from glycerol and citric acid. Glycerol is heated to about 80° C. and citric acid is added to the heated glycerol. The amount of glycerol and citric acid in the mixture at the time the mixture reaches the reaction time are illustrated by the labeled peaks 1 and 2 in FIG. 5 (t0, after adding citric acid to the glycerol at 80° C.). After the temperature of the glycerol and citric acid mixture reaches about 120-140° C., the glycerol and citric acid react to form a mixture of monoglyceryl citrate, diglyceryl citrate, triglyceryl citrate and other citric acid-based esters that have a molecular weight greater than the mono-, di-, and triglyceryl citrates. These reactants and reaction products are illustrated by the labeled peaks 3, 4 and 5 in FIG. 5 after reacting for about 45 minutes (t45). As the reaction proceeds, essentially all of the citric acid reacts, however the pre-reacted product still includes about 5-25 wt % unreacted glycerol as illustrated by labeled peak 6 in FIG. 5 after reacting for 5 hours (t300). The reaction or disappearance of citric acid in the mixture is illustrated by the disappearance or absence of the labeled peak 2. The labeled peaks 7, 8 and 9 also illustrate the formation of the mono-, di- and triglyceryl esters and citric acid-based esters having molecular weights greater the mono-, di- and triglyceryl ester. Suitable reaction times are from about 1.5 hours to 24 hours. In some aspects, the reaction proceeds until there is less than 25% unreacted glycerol. In other aspects, the reaction proceeds until there is less than 15% unreacted glycerol. In still other aspects, a Metal I cation, a citrate anion, or both are included in the reaction mixture. The pH of the pre-reacted product can be adjusted to be in a range of about 0.5 to about 6, in some aspects preferably adjusted in a range of about 0.5 to 4, or in other aspects preferably adjusted in a range of about 1.9 to 2.6.

The various components of the composition illustrated by FIG. 5 were readily determined by diluted an aliquot of the mixture of glycerol and citric acid with 100 parts by weight of a 0.01 N sulfuric acid solution and then analyzing the diluted aliquot by HPLC using a BioRad 87H column at a temperature of 60° C. at a flow rate of 0.6 mL/min using a refractive index detector.

If desired, the reaction can be quenched with either water or an aqueous solution of sodium hydroxide after the reaction has been going for a pre-determined period of time. When the reaction is quenched with water or with a solution of sodium hydroxide, typically having a temperature of less than 100° C., generally less than 15 wt % of the solution based on the weight of the reaction mixture is added. In other embodiments, less than 10 wt %, or less than 5 wt %, of the solution based on the weight of the reaction mixture is added. Some embodiments of the quenched reaction product have about 5 wt % water and from about 3 wt % to about 20 wt % glycerol. The viscosities of the diluted reaction mixtures, when measured at 25° C., may range from about 35,000 cP for 5 w % added water to about 1,600 cP for 15 wt % added water.

The reaction conditions and processes set out above provide a pre-reacted product that includes (a) from about 5 wt % to about 25 wt % glycerol; (b) from about 10 wt % to about 70 wt % monoglyceryl citrate, diglyceryl citrate, and triglyceryl citrate; (c) and less than 5 wt % unreacted citric acid. The pre-reacted product may include a Metal I cation, a citrate anion, or both as well as higher molecule weight citric acid-based esters. A suitable Metal I cation, for example, is sodium (which typically is derived from the reaction of sodium hydroxide with citric acid and/or from tri-sodium citrate). A suitable citrate anion, for example, is tri-sodium citrate.

In an alternate embodiment, the binder composition may include a polyglycerol, such as OxiCure® 520, OxiCure® 510, and OxiCure® 500 (each is available from Cargill) in lieu of, or in addition to, the pre-reacted product. The polyglycerol not only serves as a process aid, it provides for better ramp quality and improved water resistance of the final product. The polyglycerol may be present in the binder composition in an amount from about 5% to about 40% by weight of the total solids in the binder composition, from about 10% to about 30% by weight, or from about 10% to about 15% by weight.

Optionally, the binder composition may include a catalyst to assist in the crosslinking. The catalyst may include inorganic salts, Lewis acids (i.e., aluminum chloride or boron trifluoride), Bronsted acids (i.e., sulfuric acid, p-toluenesulfonic acid and boric acid) organometallic complexes (i.e., lithium carboxylates, sodium carboxylates), and/or Lewis bases (i.e., polyethyleneimine, diethylamine, or triethylamine). Additionally, the catalyst may include an alkali metal salt of a phosphorous-containing organic acid; in particular, alkali metal salts of phosphorus acid, hypophosphorus acid, or polyphosphoric acids. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexamethaphosphate, potassium phosphate, potassium tripolyphosphate, sodium trimetaphosphate, sodium tetramethaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also or alternatively be used as the catalyst/accelerator. The catalyst or cure accelerator may be present in the binder composition in an amount from about 0% to about 10% by weight of the total solids in the binder composition, from about 1.0% to about 5.0% by weight, or from about 3.0% to about 5.0% by weight.

The binder may also include organic and/or inorganic acids and bases in an amount sufficient to adjust the pH to a desired level. The pH may be adjusted depending on the intended application, or to facilitate the compatibility of the ingredients of the binder composition. In exemplary embodiments, the pH adjuster is utilized to adjust the pH of the binder composition to an acidic pH. Examples of suitable acidic pH adjusters include inorganic acids such as, but not limited to sulfuric acid, phosphoric acid and boric acid and also organic acids like mono- or poly-carboxylic acids, such as, but not limited to, citric acid, acetic acid, anhydrides thereof, and their corresponding salts. Also, inorganic salts that can be acid precursors may be utilized. The acid adjusts the pH, and in some instances, as discussed above, acts as a crosslinking agent. The pH of the binder may range from about 1 to about 7, from about 2 to about 5, or from about 2 to about 4. In at least one exemplary embodiment, the pH of the binder composition is about 3. The pH adjuster in an acidic binder composition may be present in the binder composition in an amount sufficient to obtain the desired pH.

The binder may also include a dust suppression agent such as a mineral oil, vegetable oil, peanut oil, silicone, and the like. In embodiments where a dust suppression agent is utilized, the dust suppression agent may be present in the binder composition in an amount from about 0.1 to about 5% by glass weight, from about 0.5 to about 2.0%, or from about 1.0% from about 3.0% by weight.

Further, the binder composition may contain a moisture resistant agent, such as alum, aluminum sulfate, latex, a silicon emulsion, reactive silicone emulsion, a hydrophobic polymer emulsion (e.g., polyethylene emulsion or polyester emulsion), and mixtures thereof. In at least one exemplary embodiment, the latex system is an aqueous latex emulsion. The latex emulsion includes latex particles that are typically produced by emulsion polymerization. In addition to the latex particles, the latex emulsion may include water, a stabilizer such as ammonia, and a surfactant. The moisture resistant agent may be present in the binder composition in an amount from about 0% to about 20% by weight of the total solids in the binder composition, from about 5.0% to about 10% by weight, or from about 5.0% to about 7.0% by weight.

The binder may optionally contain conventional additives such as, but not limited to corrosion inhibitors, dyes, pigments, fillers, colorants, UV stabilizers, thermal stabilizers, anti-foaming agents, anti-oxidants, emulsifiers, preservatives (e.g., sodium benzoate), biocides, fungicides, and mixtures thereof. Other additives may be added to the binder composition for the improvement of process and product performance. Such additives include lubricants, wetting agents, surfactants, antistatic agents, and/or water repellent agents. Additives may be present in the binder composition from trace amounts (such as <about 0.1% by weight the binder composition) up to about 10.0% by weight of the total solids in the binder composition. In some exemplary embodiments, the additives are present in an amount from about 0.1% to about 5.0% by weight of the total solids in the binder composition, from about 1.0% to about 4.0% by weight, or from about 1.5% to about 3.0% by weight.

The binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers. In particular, the binder composition may contain water in an amount from about 50% to about 98.0% by weight of the total solids in the binder composition.

The binder composition may be made by dissolving or dispersing the crosslinking agent in water to form a mixture. Next, the carbohydrate may be mixed with the crosslinking agent in the mixture to form the binder composition. If desired, a cure accelerator (i.e., catalyst) may be added to the binder composition. The pre-reacted product (e.g., reacted product of an alcohol or polyol and a monomeric or polymeric polycarboxylic acid) may be added to the binder composition after the crosslinking agent, after which, the coupling agent(s), dust suppression agent (e.g., mineral oil), and any desired additives may be added. The binder composition may be further diluted with water to obtain a desired amount of solids. If necessary, the pH of the mixture may be adjusted to the desired pH level with organic and inorganic acids and bases.

In the broadest aspect of the invention, the polyester bio-based binder composition is formed of a carbohydrate (e.g., maltodextrin), a crosslinking agent (e.g., polyacrylic acid or citric acid), and a pre-reacted product that is the reaction product of an alcohol or polyol with a monomeric or polymeric polycarboxylic acid. The range of components used in the inventive binder composition according to embodiments of the invention is set forth in Table 1.

TABLE 1

| Component | % By Weight of Total Solids |
|---|---|
| Carbohydrate | 30-95 |
| Crosslinking Agent | 1-40 |
| Pre-Reacted Product[1] | 5-50 |

[1]pre-reacted product of an alcohol or polyol and a monomeric or polymeric polycarboxylic acid Aqueous binder compositions according to other exemplary embodiments of the present invention are set forth in Table 2.

TABLE 2

| Component | % By Weight of Total Solids |
|---|---|
| Carbohydrate | 30-95 |
| Silane Coupling Agent | 1-40 |
| Crosslinking Agent | 1-40 |
| Pre-Reacted Product[1] | 5-50 |

[1]pre-reacted product of an alcohol or polyol and a monomeric or polymeric polycarboxylic acid Aqueous binder compositions according to further embodiments of the present invention are set forth in Table 3.

TABLE 3

| Component | % By Weight of Total Solids |
|---|---|
| Carbohydrate | 30-95 |
| Silane Coupling Agent | 1-40 |
| Crosslinking Agent | 1-40 |
| Pre-Reacted Product[1] | 5-50 |
| Catalyst/accelerator | 1-10 |

[1]pre-reacted product of an alcohol or polyol and a monomeric or polymeric polycarboxylic acid In one exemplary embodiment, the binder composition is used to form an insulation product. Fibrous insulation products are generally formed of matted inorganic fibers bonded together by a cured thermoset polymeric material. Examples of suitable inorganic fibers include glass fibers, wool glass fibers, and ceramic fibers. Optionally, other reinforcing fibers such as natural fibers and/or synthetic fibers such as polyester, polyethylene, polyethylene terephthalate, polypropylene, polyamide, aramid, and/or polyaramid fibers may be present in the insulation product in addition to the glass fibers. The term "natural fiber" as used in conjunction with the present invention refers to plant fibers extracted from any part of a plant, including, but not limited to, the stem, seeds, leaves, roots, or phloem. Examples of natural fibers suitable for use as the reinforcing fiber material include basalt, cotton, jute, bamboo, ramie, bagasse, hemp, coir, linen, kenaf, sisal, flax, henequen, and combinations thereof. Insulation products may be formed entirely of one type of fiber, or they may be formed of a combination of types of fibers. For example, the insulation product may be formed of combinations of various types of glass fibers or various combinations of different inorganic fibers and/or natural fibers depending on the desired application for the insulation. The embodiments described herein are with reference to insulation products formed entirely of glass fibers.

Figure 2:
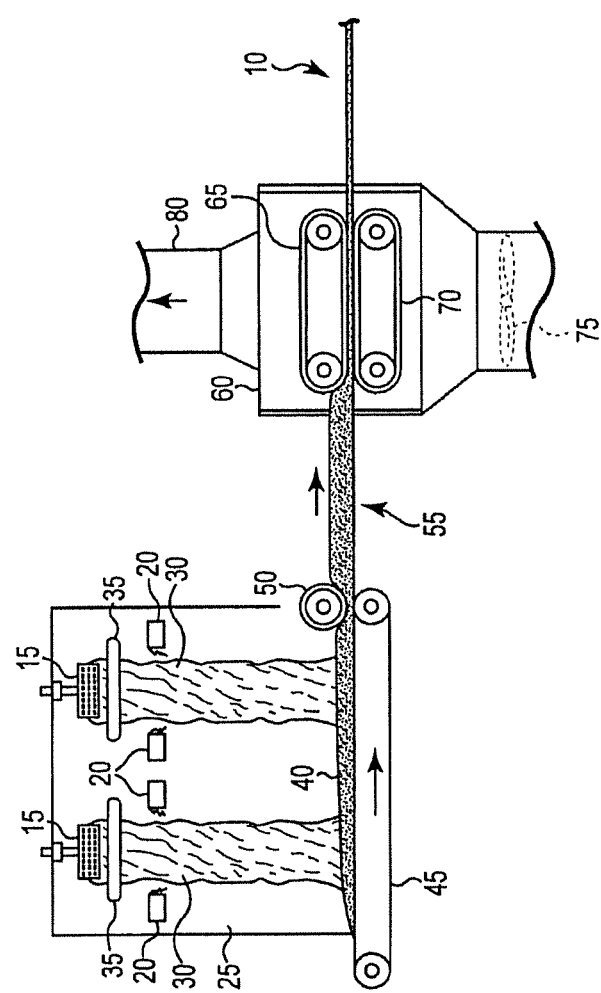
FIG. 2 is a is an elevational view of a manufacturing line for producing a fiberglass insulation product with the inventive binder composition where the insulation product does not contain a facing material according to another exemplary embodiment of the present invention.

The manufacture of glass fiber insulation may be carried out in a continuous process by fiberizing molten glass, immediately forming a fibrous glass batt on a moving conveyor, and curing the binder on the fibrous glass insulation batt to form an insulation blanket as depicted in FIGS. 1 and 2. Glass may be melted in a tank (not shown) and supplied to a fiber forming device such as a fiberizing spinner 15. The spinners 15 are rotated at high speeds. Centrifugal force causes the molten glass to pass through holes in the circumferential sidewalls of the fiberizing spinners 15 to form glass fibers. Glass fibers 30 of random lengths may be attenuated from the fiberizing spinners 15 and blown generally downwardly, that is, generally perpendicular to the plane of the spinners 15, by blowers 20 positioned within a forming chamber 25. It is to be appreciated that the glass fibers 30 may be the same type of glass or they may be formed of different types of glass. It is also within the purview of the present invention that at least one of the fibers 30 formed from the fiberizing spinners 15 is a dual glass fiber where each individual fiber is formed of two different glass compositions.

The blowers 20 turn the fibers 30 downward to form a fibrous batt 40. The glass fibers 30 may have a diameter from about 2 to about 9 microns, or from about 3 to about 6 microns. The small diameter of the glass fibers 30 helps to give the final insulation product a soft feel and flexibility.

The glass fibers, while in transit in the forming chamber 25 and while still hot from the drawing operation, are sprayed with the inventive aqueous binder composition by an annular spray ring 35 so as to result in a distribution of the binder composition throughout the formed insulation pack 40 of fibrous glass. Water may also be applied to the glass fibers 30 in the forming chamber 25, such as by spraying, prior to the application of the aqueous binder composition to at least partially cool the glass fibers 30. The binder may be present in an amount from less than or equal to 30% by weight of the total product.

The glass fibers 30 having the uncured resinous binder adhered thereto may be gathered and formed into an uncured insulation pack 40 on an endless forming conveyor 45 within the forming chamber 25 with the aid of a vacuum (not shown) drawn through the fibrous pack 40 from below the forming conveyor 45. The residual heat from the glass fibers 30 and the flow of air through the fibrous pack 40 during the forming operation are generally sufficient to volatilize a majority of the water from the binder before the glass fibers 30 exit the forming chamber 25, thereby leaving the remaining components of the binder on the fibers 30 as a viscous or semi-viscous high-solids liquid.

The coated fibrous pack 40, which is in a compressed state due to the flow of air through the pack 40 in the forming chamber 25, is then transferred out of the forming chamber 25 under exit roller 50 to a transfer zone 55 where the pack 40 vertically expands due to the resiliency of the glass fibers. The expanded insulation pack 40 is then heated, such as by conveying the pack 40 through a curing oven 60 where heated air is blown through the insulation pack 40 to evaporate any remaining water in the binder, cure the binder, and rigidly bond the fibers together. Heated air is forced though a fan 75 through the lower oven conveyor 70, the insulation pack 40, the upper oven conveyor 65, and out of the curing oven 60 through an exhaust apparatus 80. The cured binder imparts strength and resiliency to the insulation blanket 10. It is to be appreciated that the drying and curing of the binder may be carried out in either one or two different steps. The two stage (two-step) process is commonly known as B-staging.

Also, in the curing oven 60, the insulation pack 40 may be compressed by upper and lower foraminous oven conveyors 65, 70 to form a fibrous insulation blanket 10. It is to be appreciated that the insulation blanket 10 has an upper surface and a lower surface. In particular, the insulation blanket 10 has two major surfaces, typically a top and bottom surface, and two minor or side surfaces with fiber blanket 10 oriented so that the major surfaces have a substantially horizontal orientation. The upper and lower oven conveyors 65, 70 may be used to compress the insulation pack 40 to give the insulation blanket 10 a predetermined thickness. It is to be appreciated that although FIG. 1 depicts the conveyors 65, 70 as being in a substantially parallel orientation, they may alternatively be positioned at an angle relative to each other (not illustrated).

The curing oven 60 may be operated at a temperature from about 100° C. to about 325° C., or from about 250° C. to about 300° C. The insulation pack 40 may remain within the oven for a period of time sufficient to crosslink (cure) the binder and form the insulation blanket 10. The inventive binder composition cures at a temperature that is lower than the curing temperature of conventional formaldehyde binders. This lower curing temperature requires less energy to heat the insulation pack, and non-woven chopped strand mat described in detail below, which results in lower manufacturing costs.

A facing material 93 may then be placed on the insulation blanket 10 to form a facing layer 95. Non-limiting examples of suitable facing materials 93 include Kraft paper, a foil-scrim-Kraft paper laminate, recycled paper, and calendared paper. The facing material 93 may be adhered to the surface of the insulation blanket 10 by a bonding agent (not shown) to form a faced insulation product 97. Suitable bonding agents include adhesives, polymeric resins, asphalt, and bituminous materials that can be coated or otherwise applied to the facing material 93. The faced fibrous insulation 97 may subsequently be rolled for storage and/or shipment or cut into predetermined lengths by a cutting device (not illustrated). Such faced insulation products may be used, for example, as panels in basement finishing systems, as duct-wrap, ductboard, as faced residential insulation, and as pipe insulation. It is to be appreciated that, in some exemplary embodiments, the insulation blanket 10 that emerges from the oven 60 is rolled onto a take-up roll or cut into sections having a desired length and is not faced with a facing material 93. Optionally, the insulation blanket 10 may be slit into layers and by a slitting device and then cut to a desired length (not illustrated).

A significant portion of the insulation placed in the insulation cavities of buildings is in the form of insulation blankets rolled from insulation products such as is described above. Faced insulation products are installed with the facing placed flat on the edge of the insulation cavity, typically on the interior side of the insulation cavity. Insulation products where the facing is a vapor retarder are commonly used to insulate wall, floor, or ceiling cavities that separate a warm interior space from a cold exterior space. The vapor retarder is placed on one side of the insulation product to retard or prohibit the movement of water vapor through the insulation product.

The presence of water, dust, and/or other microbial nutrients in the insulation product 10 may support the growth and proliferation of microbial organisms. Bacterial and/or mold growth in the insulation product may cause odor, discoloration, and deterioration of the insulation product 10, such as, for example, deterioration of the vapor barrier properties of the Kraft paper facing. To inhibit the growth of unwanted microorganisms such as bacteria, fungi, and/or mold in the insulation product 10, the insulation pack 40 may be treated with one or more anti-microbial agents, fungicides, and/or biocides. The anti-microbial agents, fungicides, and/or biocides may be added during manufacture or in a post manufacture process of the insulation product 10. It is to be appreciated that the insulation product using the inventive binder composition can be a fiberglass batt as depicted, or as loosefill insulation, ductboard, ductliner, or pipe wrap (not depicted in the Figures).

Figure 3:
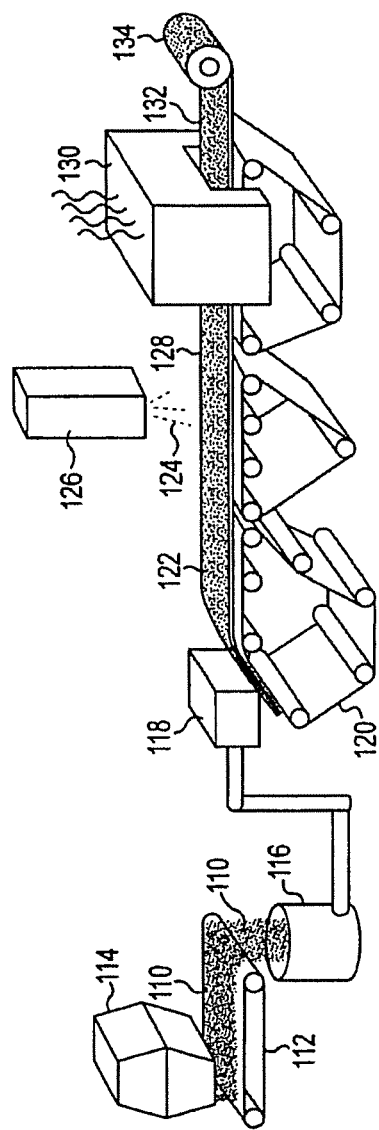
FIG. 3 is a schematic illustration of a wet-laid processing line for foil ling a chopped strand mat utilizing the inventive binder composition according a further exemplary embodiment of the present invention.

In a second embodiment of the present invention, the binder composition may be used to form a non-woven chopped strand mat. In particular, binder is added during the formation of the chopped strand mat in a wet-laid mat processing line. One exemplary process of separately adding the coupling agent to the chopped strand mat is depicted in FIG. 3. It is to be appreciated that reference is made herein to glass fibers, although the chopped strand mat could be formed of, or include, non-glass fibers. Chopped glass fibers 110 may be provided to a conveying apparatus such as a conveyor 112 by a storage container 114 for conveyance to a mixing tank 116 that contains various surfactants, viscosity modifiers, defoaming agents, and/or other chemical agents with agitation to disperse the fibers and form a chopped glass fiber slurry (not shown). The glass fiber slurry may be transferred to a head box 118 where the slurry is deposited onto a conveying apparatus such as a moving screen or foraminous conveyor 120 and a substantial portion of the water from the slurry is removed to form a web (mat) 122 of enmeshed fibers. The water may be removed from the web 122 by a conventional vacuum or air suction system (not shown).

The inventive binder 124 is applied to the web 122 by a suitable binder applicator, such as the spray applicator 126 or a curtain coater (not illustrated). Once the binder 124 has been applied to the mat 122, the binder coated mat 128 is passed through at least one drying oven 130 to remove any remaining water and cure the binder composition 124. The formed non-woven chopped strand mat 132 that emerges from the oven 130 is an assembly of randomly oriented, dispersed, individual glass fibers. The chopped strand mat 132 may be rolled onto a take-up roll 134 for storage for later use as illustrated. The non-woven mat can be used in roofing, flooring, ceiling, wall applications, as filters, in ground based vehicles, and in aircraft.

There are numerous advantages provided by the inventive binder formulations. For example, unlike conventional urea-formaldehyde binders, inventive binders may have a light color after curing. In addition, the carbohydrate is natural in origin and derived from renewable resources. By lowering or eliminating formaldehyde emission, the overall volatile organic compounds (VOCs) emitted in the workplace are reduced. Additionally, because carbohydrates are relatively inexpensive, the insulation product or chopped fiber mat can be manufactured at a lower cost. Also, the pre-reacted product helps to speed the crosslinking reaction, induces faster water evaporation, decreases the viscosity of the binder, helps to reduce the amount of water needed for application of the binder, decreases tackiness, and helps to achieve a maximum vertical expansion of the insulation pack in the transfer zone. Further, the binder has low to no odor, making it more desirable to work with.

Having generally described this invention, a further understanding can be obtained by reference to certain specific examples illustrated below which are provided for purposes of illustration only and are not intended to be all inclusive or limiting unless otherwise specified.

EXAMPLES

Example 1

The effect on the ramp height of adding a pre-reacted glycerol-citric acid (GlyCA) to the binder mix is depicted in Table 4. As can be seen in Table 4, the addition of GlyCA improved ramp quality and ramp height when varying the ratios of the components without the need of additional water, which could require more water evaporation during curing (and longer curing times). It was noted that the results can vary depending on how long the glycerol-citric acid were pre-reacted (e.g., 1 h, 2 h or 3 h).

TABLE 4

Ramp Height Measured While Making R-20
Fiberglass Insulation Using Polyester Bio-Based Binders

| Formulation | Ramp Height (in) |
|---|---|
| 70:10:20 MD-CA-GlyCA w/5% SHP | 12.20 |
| 60:10:30 MD-CA-GlyCA w/5% SHP | 12.99 |
| 50:20:30 MD-CA-GlyCA w/5% SHP | 17.32 |

** MD = maltodextrin,
CA = citric acid,
GlyCA = pre-reacted glycerol/citric acid,
SHP = sodium hypophosphite

Example 2

Pre-Reacted Product of Glycerol and Citric Acid

General procedure. Glycerol (USP grade) is added to a reaction vessel fitted with a temperature probe and agitator. The amount of glycerol is selected to provide a molar ratio of glycerol to citric acid of about 1.5-3:1. The glycerol is heated to a reaction temperature of about 115° C. to about 145° C. As the glycerol reaches a temperature of about 80° C., citric acid is added to the reaction vessel in small portions. The reaction is allowed to proceed for about 1.5 hours to about 24 hours. The reaction may be quenched with water or an aqueous sodium hydroxide solution if desired.

Using the general conditions above, 13 samples were prepared. The properties of these samples are provided in Table 5.

TABLE 5

| Exp # | Glycerol:total citric/citrate (molar ratio) | Temp (° C.) | Other conditions | Relative % Conversion (reduction of glycerol) | Glycerol remaining (g gly/g product) |
|---|---|---|---|---|---|
| 1007-006 | 2:1 | 130 | | 75% @ 8 hrs | 0.13 |
| 1007-011 | 2:1 | 140 | | 75% @ 3 hrs | 0.13 |
| 1008-002 | 2:1 | 120 | | 70% @ 6 hrs | 0.15 |
| 1008-004 | 2:1 | 120 | | 72% @ 5 hrs | 0.14 |
| 1008-005 | 3:1 | 130 | | 69% @ 23.5 hrs | 0.18 |
| 1008-006 | 3:1 | 140 | | 71% @ 9.75 hrs | 0.17 |
| 1008-012 | 2.5:1 | 120 | | 76% @ 22.5 hrs | 0.13 |
| 1009-002 | 2:1 | 130 | | 74% @ 3 hrs | 0.12 |
| 1009-003 | 3:2 | 130 | | 82% @ 1.5 hrs | 0.07 |
| 1009-007 | 2:1 | 130 | 2:1 citric:trisodium citrate | 49% @ 4.5 hrs | 0.23 |
| 1009-009 | 2:1 | 130 | 5:1 citric:trisodium citrate | 64% @ 3.5 hrs, 68% @ 19 hrs | 0.17 (3.5 hours), 0.15 (19 hours) |

TABLE 5-continued

| | | | | | |
|---|---|---|---|---|---|
| 1009-011 | 2:1 | 130 | 11:1 citric:trisodium citrate | 72% @ 3 hrs, 75% @ 23.5 hrs | 0.13 (3 hours), 0.12 (23.5 hours) |
| 1009-012 | 3:2 | 130 | 5:1 citric:trisodium citrate | 73% @ 2.5 hrs, 77% @ 18.5 hrs | 0.11 (2.5 hours), 0.09 (18.5 hours) |

| | | | | Relative Composition (Area %) | | |
|---|---|---|---|---|---|---|
| | | Mw Information* | | mono/di/tri | | |
| Exp # | pH | Mn | Mw | PD | esters | Higher Mw esters | Glycerol |
| 1007-006 | 0.9 | 2684 | 2136 | 1.69 | 23 | 65 | 12 |
| 1007-011 | 1-1.5 | | | | 22 | 66 | 12 |
| 1008-002 | — | | | | 28 | 58 | 14 |
| 1008-004 | 1.2-1.4 | | | | 28 | 59 | 13 |
| 1008-005 | — | 1910 | 2126 | 1.51 | 17 | 64 | 16 |
| 1008-006 | 1.8-2.2 | | | | 14 | 70 | 16 |
| 1008-012 | 1.5 | | | | 18 | 70 | 12 |
| 1009-002 | 0.8 | | | | 34 | 54 | 12 |
| 1009-003 | — | 3613 | 3259 | 1.46 | 28 | 66 | 6 |
| 1009-007 | — | | | | 47 | 33 | 20 |
| 1009-009 | 4.2 | | | | 33 | 52 | 15 |
| 1009-011 | 4.3 | | | | 24 | 65 | 11 |
| 1009-012 | 3.6 | 3113 | 4057 | 1.3 | 32 | 59 | 9 |

*Mw were determined by using the Dionex P680 Pump and Shimadzu RID-6A and Polylab SEC offline software under the following conditions:
Temperature: (30° C.)
Eluent and Solvent: 0.1M NaNo3 in DI water
Sample Conc: 0.40%
Injection Volume: 20 μl
Flow rate: 0.5 ml/minute
Columns: Guard column: 08033-TSKgel Guard PWxl
TOSOH Bioscience SEC columns
1) TSK-GEL G4000pwxl
2) G3000pwxl and
3) G2500pwxl
Standards: Polymer Laboratories PEG/PEO Easivial (Mw range 1258000-194)

Example 3

Figure 4:
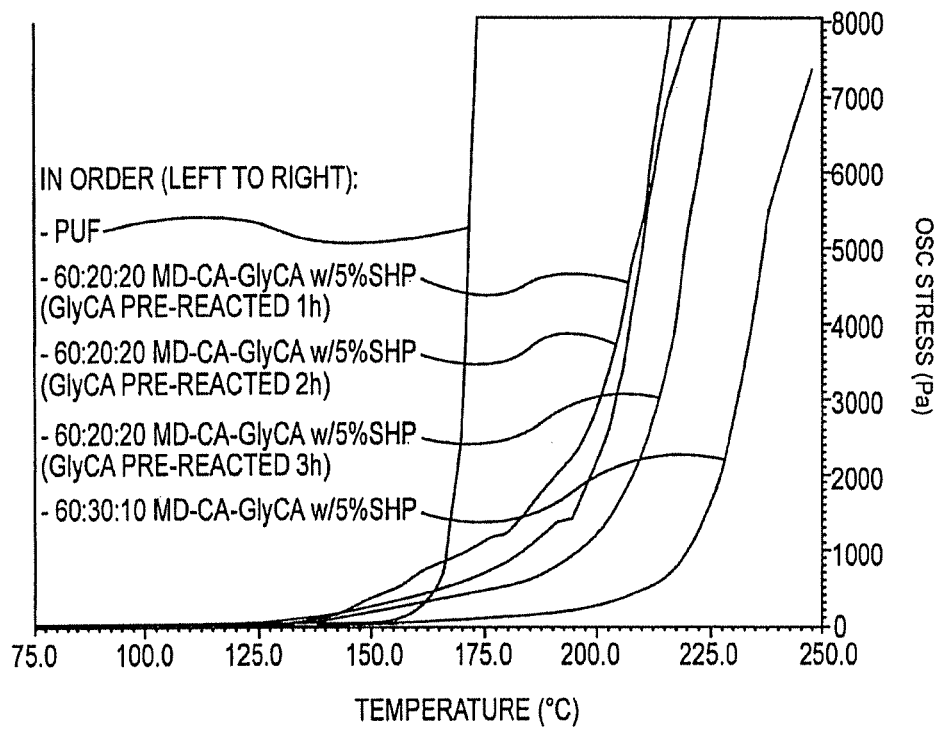
FIG. 4 is a graphical illustration of the rheology data obtained from the inventive polyester bio-based binder containing a pre-reacted product of glycerol and citric acid where the glycerol and citric acid were pre-reacted for 1 h, 2 h, and 3 h, respectively, before adding the pre-reacted product to the binder composition. Additionally, a binder composition with added polyglycerol was included for comparison purposes.

A pre-reacted product of glycerol and citric acid was made by heating 10 kg of glycerol combined with 10.4 kg of anhydrous citric acid in a chemical reactor at 130° C. for 1, 2, or 3 hours under ambient conditions. For most of the binder compositions, the GlyCA was dissolved in water to a 50% concentration prior to be used. FIG. 4 illustrates the rheology data obtained from the polyester bio-based binders containing a pre-reacted product of glycerol and citric acid where the glycerol and citric acid were pre-reacted for 1 h, 2 h, and 3 h, respectively, before adding the pre-reacted product to the binder composition. Additionally, a binder composition with added polyglycerol was included in FIG. 4 for comparison purposes.

Example 4

The binder formulations set forth in Table 6 were utilized to form handsheets in the manner described in detail below. The nonwoven fiberglass handsheets were dried and cured for three minutes at 400° F. The tensile strength, the Loss on Ignition (LOI), and the tensile strength divided by the LOI (tensile strength/LOI) for each sample was determined under ambient and steam conditions. The tensile strength was measured using Instron. The loss on ignition (LOI) of the reinforcing fibers is the reduction in weight experienced by the fibers after heating them to a temperature sufficient to burn or pyrolyze the organic size from the fibers. The loss on ignition was measured according to the procedure set forth in TAPPI T-1013 OM06, Loss on Ignition of Fiberglass Mats (2006). To place the handsheet in a steam environment, the handsheets were placed in an autoclave at 240° F. at a pressure between 400 and 500 psi for 30 minutes.

The handsheets were made according to the following procedure. First water is added to a bucket (approximately 5 liters). To this water, 8 drops of NALCO dispersant 01NM 159 was added. A pneumatic stirrer was lowered into the bucket and set at a slow speed so as to stir but not produce foam. To this stirring mixture, wet chop glass fibers (8 grams) were added and allowed to stir for 5 minutes. A screen catch was placed in a 12×12×12 inch 40 liter Williams standard pulp testing apparatus (a.k.a. a deckle box) and the box was closed. The deckle box was then filled with water to the "3" mark and a plate stirrer was placed in the deckle box. To the water in the deckle box, a 0.5% wt. solution of polyacrylamide, NALCO 7768, (80 grams) was added and mixed until dissolved using the plate stirrer. After the glass fiber water had stirred for 5 minutes, a 0.5% wt. solution of polyacrylamide, NALCO 7768 (80 grams) was added and stirred at low speed for one minute, after which the stirring speed was set to the highest setting and allowed to stir for an additional 2 minutes. The glass fiber solution is then immediately dumped into the deckle box and stirred with the plate stirrer for 10 rapid strokes. At this point, the valve on the deckle box was depressed until the deckle box was empty. After the deckle box was drained, the box was opened and the screen with the handsheet was removed from the base by holding opposite corners of the screen. The screen was then placed on a wooden frame and the bio-based binder was applied to the handsheet using a roll coater. Excess binder was then vacuumed off. The binder-coated handsheet was placed into an oven for curing and cut into one inch strips. These strips were placed in a desiccator overnight.

The results of this experiment are set forth in Table 7.

TABLE 6

Handsheets Made With Polyester Bio-Based Binders and Additives

| Component | Sample 1 60:20:20 MD-CA-GlyCA w/5% SHP | Sample 2 55:15:30 MD-CA-GlyCA w/5% SHP | Sample 3 55:25:20 MD-CA-GlyCA w/5% SHP | Sample 4 60:30:10 MD-CA-PolyGly w/5% SHP |
|---|---|---|---|---|
| Maltodextrin (50% Solids) | 57.9 g | 53.1 g | 53.1 g | 62.1 g |
| Citric Acid (100% Solids) | 9.7 g | 7.2 g | 12.1 g | 13.3 g |
| Sodium Hypophosphite (83% Solids) | 2.9 g | 2.9 g | 2.9 g | 2.7 g |
| gamma-aminopropyl-trihydroxy-silane (1.24% solution) | 7.6 g | 7.6 g | 7.6 g | 7.6 g |
| GlyCA (50% Solids) | 19.3 g | 28.9 g | 19.3 g | |
| OxiCure 520 (100% Solids) | | | | 4.4 g |
| Water | 502.5 g | 500.1 g | 504.9 g | 509.9 g |
| Total (g) | 600 g | 600 g | 600 g | 600 g |

** MD = maltodextrin, CA = citric acid, GlyCA = pre-reacted glycerol/citric acid, SHP = sodium hypophosphite, OxiCure 520 is a polyglycerol commercially available from Cargill.

TABLE 7

Mechanical Properties of Handsheets Made with Polyester Bio-Based Binders and Additives

| | Sample 1 60:20:20 MD-CA-GlyCA w/5% SHP | Sample 2 55:15:30 MD-CA-GlyCA w/5% SHP | Sample 3 55:25:20 MD-CA-GlyCA w/5% SHP | Sample 4 60:30:10 MD-CA-PolyGly w/5% SHP |
|---|---|---|---|---|
| Tensile Strength (lbf) | 4.9 | 4.8 | 4.6 | 4.6 |
| LOI (%) | 3.7 | 3.6 | 3.5 | 3.6 |
| Tensile/LOI | 1.3 | 1.3 | 1.3 | 1.3 |

** MD = maltodextrin, CA = citric acid, GlyCA = pre-reacted glycerol/citric acid, SHP = sodium hypophosphite, OxiCure 520 is a polyglycerol commercially available from Cargill.

From the data set forth in Tables 6 and 7, it was concluded that these binder formulations achieved good performance on handsheets.

The binder formulations set forth in Table 7 were utilized to form R-19 fiberglass insulation batts in a manner known by those of skill in the art. The R-19 fiberglass insulation batts had a target 6% LOI and were cured at 510° F. The mechanical properties of the batts at the end of the line were determined under ambient conditions. The results are set forth in Table 8.

TABLE 8

Binder Formulations for R-19 Insulation

| Component | Sample 1 60:20:20 MD-CA-GlyCA w/5% SHP | Sample 2 60:10:30 MD-CA-GlyCA w/5% SHP | Sample 3 50:30:20 MD-CA-GlyCA w/5% SHP | Sample 4 63:27:10 MD-CA-PolyGly w/5% SHP | Sample 3 60:25:15 MD-CA-PolyGly w/5% SHP |
|---|---|---|---|---|---|
| Maltodextrin (50% Solids) | 39.3 lbs | 39.3 lbs | 32.8 lbs | 41.3 lbs | 39.0 lbs |
| Citric Acid (50% Solids) | 13.1 lbs | 6.6 lbs | 19.7 lbs | 17.7 lbs | 16.7 lbs |
| Sodium Hypophosphite (41.5% Solids) | 3.9 lbs | 3.9 lbs | 3.9 lbs | 3.5 lbs | 3.4 lbs |
| GlyCA (50% Solids) | 13.1 lbs | 19.7 lbs | 13.1 lbs | | |
| OxiCure ® 520 (100% Solids) | | | | 3.4 lbs | 5.2 lbs |
| Oil Emulsion (50% Solids) | 12.8 lbs | 12.8 lbs | 12.8 lbs | 12.8 lbs | 12.8 lbs |
| gamma-aminopropyl-trihydroxy-silane (24.8% solution) | 0.3 lbs | 0.3 lbs | 0.3 lbs | 0.3 lbs | 0.3 lbs |
| Water | 339 lbs | 339 lbs | 339 lbs | 343 lbs | 344 lbs |

** MD = maltodextrin, CA = citric acid, GlyCA = pre-reacted glycerol/citric acid, SHP = sodium hypophosphite, OxiCure 520 is a polyglycerol commercially available from Cargill.

TABLE 9

Binder Formulations for R-19 Insulation

|  | Sample 1<br>60:20:20<br>MD-CA-<br>GlyCA<br>w/5%<br>SHP | Sample 2<br>60:10:30<br>MD-CA-<br>GlyCA<br>w/5%<br>SHP | Sample 3<br>50:30:20<br>MD-CA-<br>GlyCA<br>w/5%<br>SHP | Sample 4<br>63:27:10<br>MD-CA-<br>PolyGly<br>w/5%<br>SHP | Sample 3<br>60:25:15<br>MD-CA-<br>PolyGly<br>w/5%<br>SHP |
|---|---|---|---|---|---|
| Stiffness/Sag (degree) | 39 | 46 | 38 | 36 | 38 |
| Recovery (in) | 5.9 | 5.9 | 5.8 | 6.6 | 6.7 |

\*\* MD = maltodextrin, CA = citric acid, GlyCA = pre-reacted glycerol/citric acid, SHP = sodium hypophosphite, OxiCure 520 is a polyglycerol commercially available from Cargill.

From the data presented in Tables 8 and 9, it was concluded that these binder formulations could be cured under typical manufacturing conditions and achieved good product performance.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. An aqueous binder composition for use in the formation of fiberglass insulation and non-woven mats, the aqueous binder composition comprising:
    at least one carbohydrate having a dextrose equivalent number from 2 to 20;
    from 1.0 to 40.0 wt. % of at least one crosslinking agent, based on the weight of the total solids in the binder composition; wherein the crosslinking agent comprises one or more of polycarboxylic acids, salts of polycarboxylic acid, anhydrides, citric acid, salts of citric acid, adipic acid, salts of adipic acid, polyacrylic acid, or salts of polyacrylic acid; and
    from 10 to 60 wt. % of a pre-reacted product comprising the reaction product of a polyol with citric acid, based on the weight of the total solids in the binder composition, said polyol comprising one or more of glycerol, polyglycerol, triethanolamine, sorbitol, polyethylene glycol, propylene glycol, and ethylene glycol, and wherein said polyol and said citric acid being present in a molar ratio from about 1.5-3.0 moles polyol: 1 mole citric acid;
    wherein the pre-reacted product comprises:
        from 5 to 25 wt. % of unreacted polyol, based on the weight of the pre-reacted product; and
        less than 5 wt. % unreacted citric acid, based on the weight of the pre-reacted product.

2. The aqueous binder composition of claim 1, wherein the polyol comprises one or more of glycerol, polyglycerol, triethanolamine, and sorbitol.

3. The aqueous binder composition of claim 1, wherein the carbohydrate is a water-soluble polysaccharide comprising one or more of pectin, dextrin, maltodextrin, and starch.

4. The aqueous binder composition of claim 1, wherein the crosslinking agent comprises citric acid, salts of citric acid, and combinations thereof.

5. The aqueous binder composition of claim 1, wherein the aqueous binder composition further comprises one or more of a coupling agent, a moisture resistant agent, a dust suppression agent, a catalyst, an inorganic acid, an organic acid, an inorganic base, and an organic base.

6. The aqueous binder composition of claim 1, wherein the binder composition further comprises one or more of corrosion inhibitors, dyes, pigments, fillers, colorants, UV stabilizers, thermal stabilizers, anti-foaming agents, antioxidants, emulsifiers, preservatives, biocides, fungicides, lubricants, wetting agents, surfactants, antistatic agents, and water repellent agents.

7. The aqueous binder composition of claim 1, wherein the binder composition comprises:
    from 30.0 to 95.0 wt. % of the carbohydrate, based on the weight of the total solids in the binder composition;
    from 1.0 to 40.0 wt. % of the crosslinking agent, based on the weight of the total solids in the binder composition; and
    from 5.0 to 50.0 wt. % of the pre-reacted product, based on the weight of the total solids in the binder composition.

8. The aqueous binder composition of claim 1, wherein the pre-reacted product comprises:
    (i) from 5 to 25 wt. % of unreacted glycerol, based on the weight of the pre-reacted product;
    (ii) from 10 to 70 wt. % of a mixture of monoglyceryl citrate, diglyceryl citrate, and triglyceryl citrate, based on the weight of the pre-reacted product; and
    (iii) less than 5 wt. % unreacted citric acid, based on the weight of the pre-reacted product,
    wherein the pre-reacted product has a weight average molecular weight from 1500 to 5000 Daltons.

9. The aqueous binder composition of claim 8, wherein the pre-reacted product comprises from 12 to 50 wt. % of a mixture of monoglyceryl citrate, diglyceryl citrate, and triglyceryl citrate, based on the weight of the pre-reacted product.

* * * * *